US008107722B2

(12) United States Patent
Oldroyd

(10) Patent No.: US 8,107,722 B2
(45) Date of Patent: *Jan. 31, 2012

(54) SYSTEM AND METHOD FOR AUTOMATIC STEREO MEASUREMENT OF A POINT OF INTEREST IN A SCENE

(75) Inventor: Lawrence A. Oldroyd, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/852,776

(22) Filed: Aug. 9, 2010

(65) Prior Publication Data

US 2011/0007948 A1 Jan. 13, 2011

Related U.S. Application Data

(60) Division of application No. 11/671,736, filed on Feb. 6, 2007, now Pat. No. 7,773,799, which is a continuation-in-part of application No. 11/382,523, filed on May 10, 2006, now abandoned, which is a continuation-in-part of application No. 10/817,476, filed on Apr. 2, 2004, now Pat. No. 7,751,651.

(51) Int. Cl.
*G06K 9/00* (2006.01)
(52) U.S. Cl. ........ 382/154; 382/106; 382/283; 382/285; 382/286; 382/305
(58) Field of Classification Search .................. 382/154, 382/106, 283, 285, 286, 305
See application file for complete search history.

(56) References Cited

U.S. PATENT DOCUMENTS

| 4,635,293 | A | 1/1987 | Watanabe |
| 4,970,666 | A | 11/1990 | Welsh et al. |
| 4,988,189 | A | 1/1991 | Kroupa et al. |
| 5,124,915 | A | 6/1992 | Krenzel |

(Continued)

FOREIGN PATENT DOCUMENTS

EP 0841537 A2 5/1998

(Continued)

OTHER PUBLICATIONS

Barrow et al., "Parametric Correspondence and Chamfer Matching: Two New Techniques for Image Matching," In Proc 5.sup.th Int. Joint Conf. Artificial Intelligence, Vision 7, 1997, pp. 659-663.

(Continued)

*Primary Examiner* — Mike Rahmjoo
(74) *Attorney, Agent, or Firm* — Harness, Dickey & Pierce, P.L.C.

(57) ABSTRACT

A system for performing a three dimensional stereo measurement that uses a sensor for obtaining a sensor image of a scene, and a database for providing first and second reference images of the scene that are a stereo pair of images. At least one processing system is responsive to an output of the sensor and in communication with the database. The processing system registers the sensor image with the first reference image, and also selects a point of interest from one of the sensor image and the first reference image. The processing system performs a stereo point measurement from the selected point of interest and the first reference image to determine a point in the second reference image that represents a stereo mate of the selected point in the first reference image.

20 Claims, 12 Drawing Sheets

U.S. PATENT DOCUMENTS

| | | | |
|---|---|---|---|
| 5,173,949 | A | 12/1992 | Peregrim et al. |
| 5,495,540 | A | 2/1996 | Frankot et al. |
| 5,550,937 | A | 8/1996 | Bell et al. |
| 5,606,627 | A | 2/1997 | Kuo |
| 5,647,015 | A | 7/1997 | Choate et al. |
| 5,809,171 | A | 9/1998 | Neff et al. |
| 5,890,808 | A | 4/1999 | Neff et al. |
| 5,982,930 | A | 11/1999 | Neff et al. |
| 5,982,945 | A | 11/1999 | Neff et al. |
| 5,995,681 | A | 11/1999 | Lee et al. |
| 6,266,452 | B1 | 7/2001 | McGuire |
| 6,512,857 | B1 | 1/2003 | Hsu et al. |
| 6,587,601 | B1 | 7/2003 | Hsu et al. |
| 6,694,064 | B1 | 2/2004 | Benkelman |
| 6,738,532 | B1 | 5/2004 | Oldroyd |
| 6,795,590 | B1 | 9/2004 | Chen |
| 6,993,184 | B2 * | 1/2006 | Matsugu ................. 382/173 |
| 7,068,815 | B2 * | 6/2006 | Chang et al. ............. 382/106 |
| 7,522,186 | B2 | 4/2009 | Arpa et al. |
| 7,751,651 | B2 | 7/2010 | Oldroyd |
| 7,773,799 | B2 | 8/2010 | Oldroyd |
| 2002/0012071 | A1 | 1/2002 | Sun |
| 2005/0147324 | A1 | 7/2005 | Kwoh et al. |
| 2005/0220363 | A1 | 10/2005 | Oldroyd |
| 2006/0215935 | A1 | 9/2006 | Oldroyd |

FOREIGN PATENT DOCUMENTS

| | | |
|---|---|---|
| WO | WO-99/18732 A1 | 4/1999 |
| WO | WO-02/07839 A2 | 1/2002 |

OTHER PUBLICATIONS

Kiremidjian, "Issues in Image Registration," IEEE Proc of SPIE, vol. 758, Image Understanding and the Man-Machine Interface, New York 1987, pp. 80-87.

Tsai, "A Versatile Camera Calibration Technique for High Accuracy 3D Machine Vision Metrology Using Off-the-Shelf TV Cameras and Lenses," IEEE Journal of Robotics and Automation, vol. RA-3, No. 4, dated Aug. 1987, pp. 323-344.

Viola, "Alignment by Maximization of Mutal Information," IEEE International Conference on Computer Vision, Boston, MA 1995.

Woo, Neider, Davis, Shreiner. "OpenGL Programming Guide," 3rd Ed., Addison Wesley, Inc., 1999, pp. 127-128; p. 674.

SoftPlotter User's Manual, Vision International, Autometrics, Inc. (now part of The Boeing Company), 1994, pp. 9-1ff.

Digital Point Position Data Base Performance Specification, MIL-PRF-89034, 1999.

Map Projections—A Working Manual, U.S. Geological Survey Paper 1385, 1987, pp. 145-153.

Sheikh, Y.; Khan, S.; Shah, M.; and Cannata, R. "Geodetic Alignment of Aerial Video Frames", http://server.cs.ucf.edu/.about.vision/papers/shah/YaserChapter.pdf, pp. 141-177, 2003.

* cited by examiner

SYSTEM AND METHOD FOR AUTOMATIC STEREO MEASUREMENT OF A POINT OF INTEREST IN A SCENE

CROSS-REFERENCE TO RELATED APPLICATIONS

This application is a divisional of U.S. patent application Ser. No. 11/671,736, filed Feb. 6, 2007, which is a continuation-in-part of U.S. patent application Ser. No. 11/382,523, filed May 10, 2006 (now abandoned), which is a continuation-in-part of U.S. patent application Ser. No. 10/817,476, filed Apr. 2, 2004 (now U.S. Pat. No. 7,751,651), the disclosures of which are hereby incorporated by reference into the present application.

FIELD

The present disclosure relates to stereo measurement methods and systems, and more particularly to a system and method for automatically obtaining a point in a second image, that is a stereo matching point in the second image of a point that has been previously selected from a different, first image, and using the stereo matching points to determine three dimensional coordinate information for the point in the first image.

BACKGROUND

The statements in this section merely provide background information related to the present disclosure and may not constitute prior art. The Boeing owned patent applications for U.S. Ser. Nos. 10/817,476 and 11/382,523, teach systems and methods to automatically register one image to a second image, where the two images are typically obtained by different means at different times and under different conditions. The first image, which may be identified as an image from a sensor, conveys a view of a scene from a particular vantage point. The second image, which may be identified as a reference image, conveys a view of the same scene from a typically different vantage point, and will typically have a different appearance from the sensor image, due to differences in vantage point and image collection conditions, such as different sensor modalities (e.g. SAR sensor and optical reference image). This reference image may come from a reference image database covering at least the scene imaged by the sensor, but typically comprises a much larger area of which the scene is only a small part. Scene content depicted in the sensor and reference images will also typically differ, as the sensor image may contain scenic features which were not present when the reference image was obtained. For example, a mobile target may be present in the sensor image, which is not shown in the reference image. Alternatively, features in the scene such as roads or houses or trees may have changed since the reference image was initially obtained, with new roads or houses being built, or trees growing to be large or having been cut down.

Registration of the two images can be accomplished by the systems and methods taught in the afore-mentioned Boeing patent applications, as long as the scenic or feature content between the sensor and reference images share enough information in common. Such a condition typically occurs in most situations.

With the foregoing Boeing patent applications, the reference image is accompanied by a method to associate individual pixels in the reference image to specific three dimensional locations in the scene depicted. For a single reference image accompanied by a digital elevation model (DEM—typically a matrix or array of elevation measurements covering the reference image area), accuracy of the scene locations so derived is typically limited primarily by the accuracy of the elevation model. The accuracy of the registration may also be limited by the accuracy of the method used to associate the other two spatial coordinates with locations in the reference image. In the case when the single reference image is one image from a Digital Point Position Data Base (DPPDB), a product of the National Geospatial-Intelligence Agency, and the elevation model is a Digital Terrain Elevation Dataset (DTED—a DEM in a specific file format), from the same Agency, the accuracy is limited to what is termed the "mono-intersection" method accuracy of the DPPDB. In the "mono-intersection" method, a point measurement for a scene is obtained by calculating a pixel location in the DPPDB image using a three dimensional scene coordinate, and then adjusting the three dimensional scene coordinate until the calculated location has the same column and row location as the desired pixel of interest.

In this limited method, the reference image or image pair can be any images having an accurately predefined relation to a local coordinate system of the scene depicted in the image or images. The elevation model can likewise be any source of three dimensional coordinate data that describes the scene surface's shape, including a computer-aided design model.

The three dimensional coordinate is obtained by using a latitude, longitude coordinate pair, with an elevation approximated using the DEM measurements near that specific location. The elevation approximation is obtained by interpolation of height measurements given in the DEM from locations nearby the specified latitude, longitude location. The accuracy is limited, however, because each given pixel location in the two dimensional image can be derived from a multiplicity of points in a three dimensional volume of three dimensional coordinate points, as the three dimensions (here, latitude, longitude and elevation, but potentially any three x, y, z coordinates three dimensional position recording) are mapped redundantly into two image dimensions (column and row).

If the elevation model were exact, so that at each specific latitude and longitude location the model gave the correct elevation for that location, then this "mono-intersection" method could give best accuracy. Most desirable would be a model that contained an accurate elevation measurement for each pixel in the reference image. It is possible to obtain elevation models that are more accurate and have greater spatial resolution than those provided by DTED, or more accurate than other readily available elevation models from other providers, such as the United States Geophysical Service. However, in practice, exact elevation models, or even high accuracy models having high spatial resolution of elevation measurements to agree with the spatial resolution of the reference image, can not be obtained easily or be used easily in a practical situation requiring rapid measurements. Such alternative, exact elevation models also typically require large amounts of data storage capability, which can be onerous for smaller systems, for example on-board systems carried by various forms of airborne and land based mobile platforms.

In some cases, the reference image may consist of a stereo pair of images, whereby both images depict the same scene area, but from slightly different perspective vantage points. The slightly different perspectives of the two stereo reference images allows stereographic processing to determine highly accurate three dimensional location coordinates for points in the scene, when depicted in both reference images. Such stereo measurements give the highest accuracy for measurements of points in the two images. In standard stereo measurement, the points in the two images must both be visible to the operator, else measurement accuracy may be reduced.

In general, image registration may not achieve sufficient accuracy, because it is limited by the accuracy of the registration, and by the accuracy of the 3-D scene coordinate associations for reference image and elevation model. Under existing art, even when using two stereo reference images, image registration may not achieve sufficient accuracy. Once the sensor image is registered to a first reference image, pixel locations in the sensor image are uniquely associated with pixel locations in the reference image. As taught in the two previously cited Boeing patent applications, this allows a point of interest in the sensor image, such as target seen only in the sensor image, to be associated with a point in the reference image where no target is seen. Thus, using the scene 3-D coordinate associations of the reference image, this point in the sensor image is associated with a 3-D scene coordinate. The accuracy of the registration governs the accuracy of locating this unseen point in the reference image, and the accuracy of the 3-D scene coordinate associations with the reference image governs the accuracy of the 3-D scene coordinate assigned to this unseen point. By means described in the two Boeing patent applications, and as discussed above, the location in scene coordinates of this point of interest in the sensor image, and its corresponding unseen point within the reference image, can then be determined. The problem, then, is that the accuracy of that measured 3-D scene location corresponding to the point in the sensor image and the unseen point in the reference image may be less than needed to accomplish the measurement goal.

With stereo reference images, registration of the sensor image to one or both of the stereo reference images is necessary also, so that 3-D scene locations can be derived for points in the sensor image that are not visible one or both of the stereo reference images. According to existing art, stereo measurement is most accurate when the two stereo images are measured simultaneously, and the point to be measured is visible in both stereo reference images. However, registering the sensor image to the two stereo reference images must be done separately. This will result in two different 3-D scene locations being associated with the point of interest in the sensor image, each of which separately has an error associated with registration, and an error of the 3-D scene coordinate association with the corresponding stereo reference image, and neither of which has the accuracy of a most accurate stereo measurement. If the point of interest is visible in both stereo reference images, most accurate stereo measurement is possible, but may be difficult to perform in many situations, such as when stereo viewing is unavailable or operational timelines are short, as is the case in tactical fighter operations, real-time robot guidance, and other applications of interest. This invention operates to overcome that deficiency.

Another problem is validating the measurement method for proper error estimation of measurements. Such validation is required by, and performed by, the National Geospatial-intelligence Agency, and is conducted to ensure that target point measurement error is properly predicted. An image registration process by itself introduces elements into the error propagation that are difficult to predict, and usually contain factors involving probability that may not be acceptable under NGA validation rules. For example, a probability of correct match could be one of those factors.

Thus, there exists need for a method and system that even more accurately enables a selected point within a scene of interest to be registered to a reference image, and then the reference image used to enable three dimensional coordinate information of the selected point to be determined in a way that ensures that optimum accuracy of the location of the selected point will be obtained.

SUMMARY

In one aspect the present disclosure relates to a system for performing a three dimensional stereo measurement. The system may comprise a sensor for obtaining a sensor image of a scene, and a database for providing first and second reference images of the scene that are a stereo pair of images. At least one processing system may be used that is responsive to an output of the sensor and in communication with the database. The processing system may be operable to register the sensor image with the first reference image, and also to select a point of interest from one of the sensor image and the first reference image. The processing system may also perform a stereo point measurement from the selected point of interest and the first reference image to determine a point in the second reference image that represents a stereo mate of the selected point in the first reference image.

In another aspect the present disclosure relates to a system for performing a three dimensional stereo measurement. The system may comprise a sensor that obtains a sensor image of a scene, as well as at least one database. The database may provide first and second reference images of the scene that are a stereo pair of images. A processing system may be in communication with the at least one database. The processing system may be configured to register the sensor image with the first reference image and to select a point of interest from one of the sensor image and the first reference image. The processing system may perform a stereo point measurement from the selected point of interest and the first reference image to determine a point in the second reference image that represents a stereo mate of the selected point in the first reference image. The processing system may also define a three dimensional grid and analyze parametric data from the selected points of interest in the first and second reference images, and each three dimensional point within the grid. This may be done to determine three dimensional coordinates of a calculated point within the second reference image that is a minimum distance from the stereo mate point in the second reference image. The processing system may also denote the calculated point as the optimum stereo coordinate measurement of the point in the second reference image.

In another aspect the present disclosure relates to a system for performing a three dimensional stereo measurement. The system may comprise a sensor carried on an airborne mobile platform for generating an image of a scene. At least one database may provide a first reference image of the scene, with the scene being comprised of a plurality of pixels, and a second reference image of the scene that is comprised of a plurality of pixels, where the first and second reference images of the scene comprise a stereo pair of images. A processing system may be included that is operable to register the sensor image with the first reference image, and to select a first pixel representing a point of interest from one of the sensor image and the first reference image. The processing system may also perform a stereo point measurement using the first pixel to determine a second pixel in the second reference image that represents a stereo mate of the first pixel in the first reference image, and to also define a three dimensional grid around a portion of the first reference image. The processing system may use the three dimensional grid and the first and second pixels to determine three dimensional coordinates of a point in the second reference image that is closest to the stereo mate point in the second reference image. The processing system may also denote the calculated point as the optimum stereo coordinate measurement of the point in the second reference image.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENTS

Figure 1:
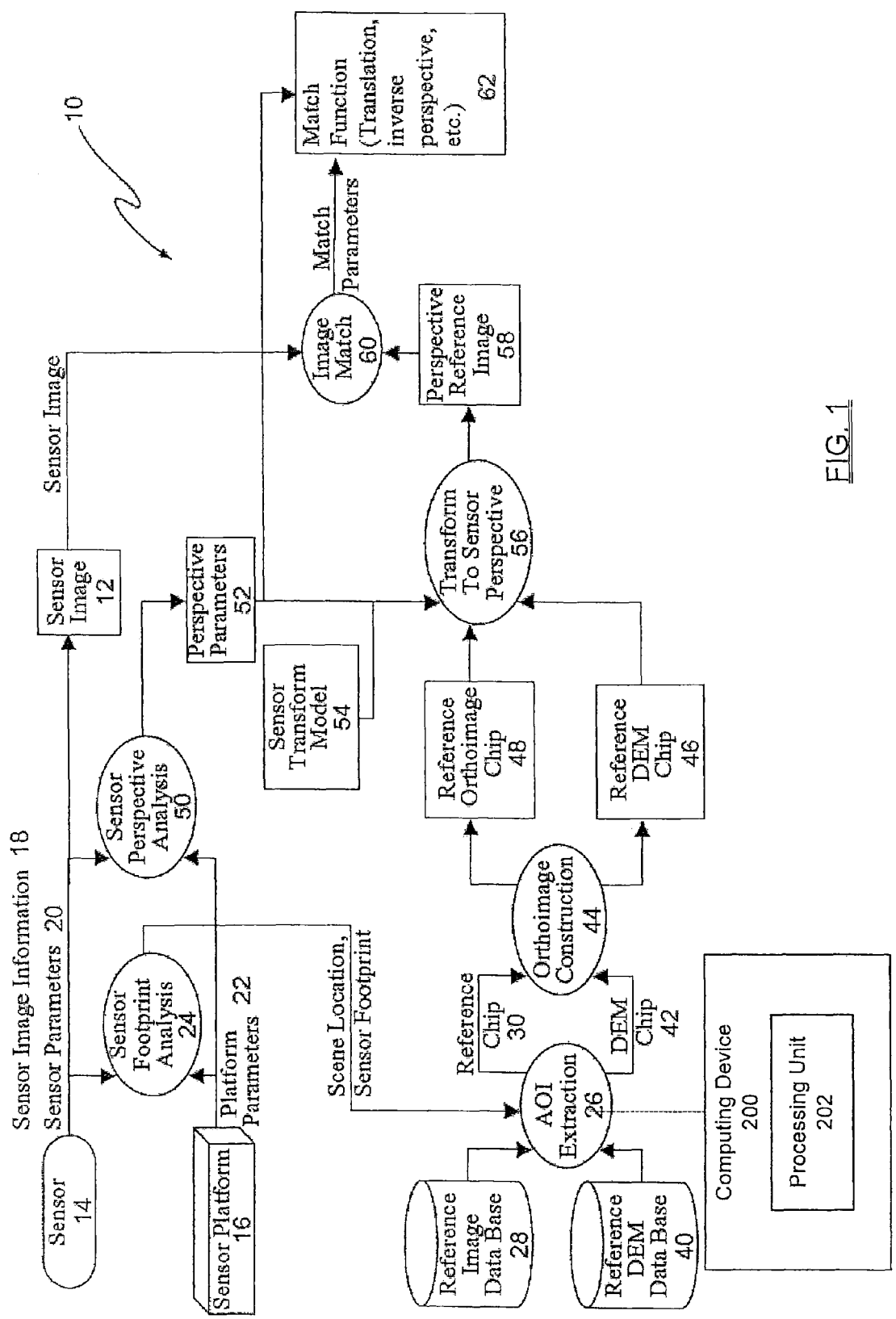
FIG. 1 is a block diagram of an exemplary embodiment of the processing architecture of the present disclosure.

The following description is merely exemplary in nature and is not intended to limit the present disclosure, application, or uses. It should be understood that throughout the drawings, corresponding reference numerals indicate like or corresponding parts and features.

Generally, in accordance with the present disclosure, a small sensor image is matched to a larger reference image. The large reference image typically covers a relatively large area of the earth at a resolution of approximately the same, or better than, that normally expected to be seen in the sensor image. The reference area may be any area that can be the subject of a controlled imaging process that produces an image with known geometric characteristics and known geometric relationships between locations in the image and locations in the subject area. For example, the reference area may be a portion of a space assembly or an area on the human body. This reference typically involves hundreds of thousands, or even millions or more of pixels (picture elements) in each of its two dimensions, and may comprise a pair of such images in a stereoscopic configuration that admits stereography in viewing and measurement. The reference image may be geocoded so that a geographic location can be accurately associated with each pixel in the image, including an elevation if a stereo pair of images is used. Alternatively, an alternate source of elevation measurements can be made available and associated with geographic locations in a similar fashion. For other types of reference areas, locations other than geographic are used as suited to the application, but some reference coordinate system is the basis for the location measurements.

The sensor image, on the other hand, is usually fairly small, typically involving a few hundred or thousand pixels in each of its two dimensions. Resolution of the sensor image usually depends on the position of the sensor relative to the scene being imaged, but the relative positions of sensor and scene are normally restricted to provide some minimal desired resolution sufficient to observe appropriate detail in the scene and comparable to the detail shown in the reference image or stereo image pair. The sensor image typically depicts a different perspective from that of the reference image, often at a much lower, oblique, angle to the scene, whereas the reference image is typically from high overhead angles. On the other hand, the perspectives may be similar, such as for a synthetic aperture radar sensor, which typically presents a generally overhead view of the scene it images. These differences in geometry, whether arising from perspective differences or differences in sensor geometry, are a problem source that is addressed and solved by the present disclosure.

Image matching is generally difficult to achieve because it involves comparing large amounts of pixel data. As the number of possible differences between the images increases, the difficulty in achieving image matching is correspondingly magnified. The simplest case occurs when the two images differ only by a translation or shift, so that a repeated comparison of the two images with each possible trial shift difference can reveal the unknown difference. However, if the images are large, the comparison becomes quite burdensome. Alternative techniques using a comparison means in an image transform domain, such as the Fourier transform domain using the correlation theorem, can ease this burden substantially. When the images are different sizes, and the problem is to find where in the larger image the smaller image best matches, other image matching techniques may apply, but image matching remains difficult.

Where the differences between the reference and sensed images are other than simple translation, image matching becomes more complex. For example, with perspective imaging there are at least six degrees of freedom in the acquisition of each image, resulting in perspective and scale differences that complicate the matching problem. In addition, individual parameters of the sensor and the means by which the sensor acquires the image are factors that can further complicate the matching process. Without some knowledge of these various acquisition and sensor parameters, the search space for matching becomes so large as to prevent useful matching. Therefore, limiting the search area is critical because of the computational difficulty in matching images.

Numerous techniques of photogrammetry have been developed to identify acquisition parameters of sensors that produce characteristic perspective and scale properties in images. This present disclosure makes use of such knowledge as is available about the images to reduce the matching problem to a tractable size so that a best match can be obtained along with a quality measure of the match to indicate its validity/invalidity.

In accordance with one embodiment disclosed herein, first the size of the reference image area to be searched is limited. With knowledge of the location of the sensor, its imaging properties (such as field of view and scale), and the location of the scene being sensed (such as the scene center), it is possible to determine the area within the reference image imaged by the sensor. This footprint of sensed image is extended by adding to it uncertainties in the locations of the sensor and scene. These uncertainties may include uncertainty as to look angles to the scene, range to the scene center, field of view, and pixel resolution in the scene. It is preferred to ensure that all uncertainties that influence the location of the sensed area within the reference image be taken into account. If the obliquity of the sensed image is low, so that a shallow view of the scene area is obtained by the sensor, it is possible that the area sensed will be quite large in the reference image. In this case, the scene area identified may be reduced to include amounts of area in front of and behind the scene center, as seen by the sensor, equal to a distance in front or behind the scene area of no more than twice the width of the sensed area, as seen by the sensor.

Next, a portion of the reference image sufficient to cover this defined area is extracted from the image database which stores the reference image. This "chip" is initially aligned with the reference image for simplicity of extraction. In this manner, a row of pixels in the chip is part of a row of pixels from the reference, and the multiplicity of adjacent rows of pixels in the chip will be from a similar multiplicity of adjacent rows of pixels from the reference.

The chip is then distorted or warped to conform to the known geometry of the sensor image. This involves several operations which may be performed in a variety of different sequences, or as a variety of combined operations, all of which result in a similar warping. One such sequence of operations will be described, but it is to be understood that other such operations known to those skilled in the art of image processing fall within the scope of this disclosure.

The essence of the warp operation is to introduce into the reference chip the same perspective distortion as is exhibited in the sensor image. Generally, this entails the following operations:

(1) An inverse perspective transform to remove perspective distortion from the reference image, along with an operation to remove any distortions peculiar to the reference image, such as lens distortions, in the case of a lens-type reference image, or slant range compression, in the case of a synthetic aperture radar or other synthetic reference image. This operation produces an orthographic image of the reference chip. If the reference image is orthographic to the scene area, or nearly so, this operation is unnecessary.

(2) A rotation to align the reference chip with the azimuthal direction of the sensor, or in the case where the sensor is looking perpendicularly down at the scene area, to align the chip with the sensor image.

(3) A perspective transform of the reference chip to the viewpoint of the sensor, along with introduction of any distortions peculiar to the sensor, such as lens distortions, in the case of a lens-type sensor, or slant range compression, in the case of a synthetic aperture radar.

Alternatively, the sensor image may be distorted or warped to conform to the known geometry of the reference image chip by operations as described above. This alternative is preferred where there is accurate knowledge of the 3-D surface in the scene area accurately associated with the sensor image.

Further alternatively, both the reference image chip and the sensor image may be distorted or warped to conform to a known common geometry. This alternative may be preferred where there is accurate knowledge of the 3-D surface in the scene area associated with both the sensor image and the reference chip, and if the perspective differences are particularly great so that warping can be done to a common perspective that is not as different from each image individually as the two images are different from each other.

To produce a warp with best accuracy, it is preferred to use information about the 3-D nature of the surface depicted in the sensor image. This is an important consideration to any perspective warp, because the height of objects in the scene determines where the objects are depicted in the image. Only in an orthographic image, in which each point is depicted as if viewed from directly overhead, will the heights of objects not affect their visual appearance and placement.

In this described embodiment, it is assumed that a 3-D surface model (i.e., a second reference image) is known for the reference image chip, so that a height can be obtained corresponding to each pixel in the reference image chip. During the warp, this height (together with the row and column location of each corresponding reference chip pixel, and the model parameters for the sensor and the sensor location and orientation), allows accurate calculation of where that point on the surface of the scene would have been imaged if a reference sensor had been at that location and orientation. The requirement is to have accurate alignment of the 3-D surface model with the reference image. Resolution of the 3-D surface model is also important, but match degradation is gradual with decrease in resolution. This 3-D surface model, often called a "digital elevation model" or "DEM", may be acquired from the same source that provides the reference image.

The reference image may be a stereo pair of images in which case the stereo images are used to generate a digital elevation model (DEM) of the chip area that expresses most of the detail in the scene area, and is in accurate alignment with the chip images. This is the preferred approach if computation resources are sufficient to perform the point-by-point matching between the chip images necessary to compute stereo disparity and derive the DEM. Alternatively, the sensor may be used to acquire two images of the scene from different perspectives, and the sensor images used as a stereo pair for stereo extraction of a DEM. The DEM will thus be in accurate alignment with the sensor images, and can be used to accurately warp the sensor image to match the geometry of the reference image.

One particular embodiment will further be described with reference to the drawings. Particularly with reference to FIG. 1, there is shown a block diagram of a processing architecture or system 10 for automatic image registration in accordance with an embodiment of the present disclosure. The processing architecture or system 10 may be implemented as software and/or hardware. For example, such software and/or hardware may include computing devices that may have one or more processors, volatile and non-volatile memory, a display device, information transport buses, and so forth. Generally, an embodiment of a process performed by such a processing architecture or system 10 may include the following operations:

(1) A sensor image 12 is collected by a sensor 14 on a platform 16, such as an aircraft, or the hand of a robot, or any other device or structure on which an imaging sensor can be attached. Information 18 about the sensor, sensing parameters 20, and platform parameters 22 are also collected. The sensing parameters include those describing the sensor itself, such as field of view, size of the image in pixel units, resolution, and focal length. Down-look or elevation angle, as well as azimuth angle and range to the center of the imaged scene, are measured relative to the external coordinates used for the reference image. Typically, the coordinates are some known geographic coordinate system, such as WGS 84, and the reference image is geocoded, so that each reference pixel has a WGS 84 latitude and longitude coordinate location associated with it. However, it is also possible to simply use an arbitrary coordinate system associated with the reference image, and describe the platform and sensor parameters appropriately in those coordinates.

Figure 2:
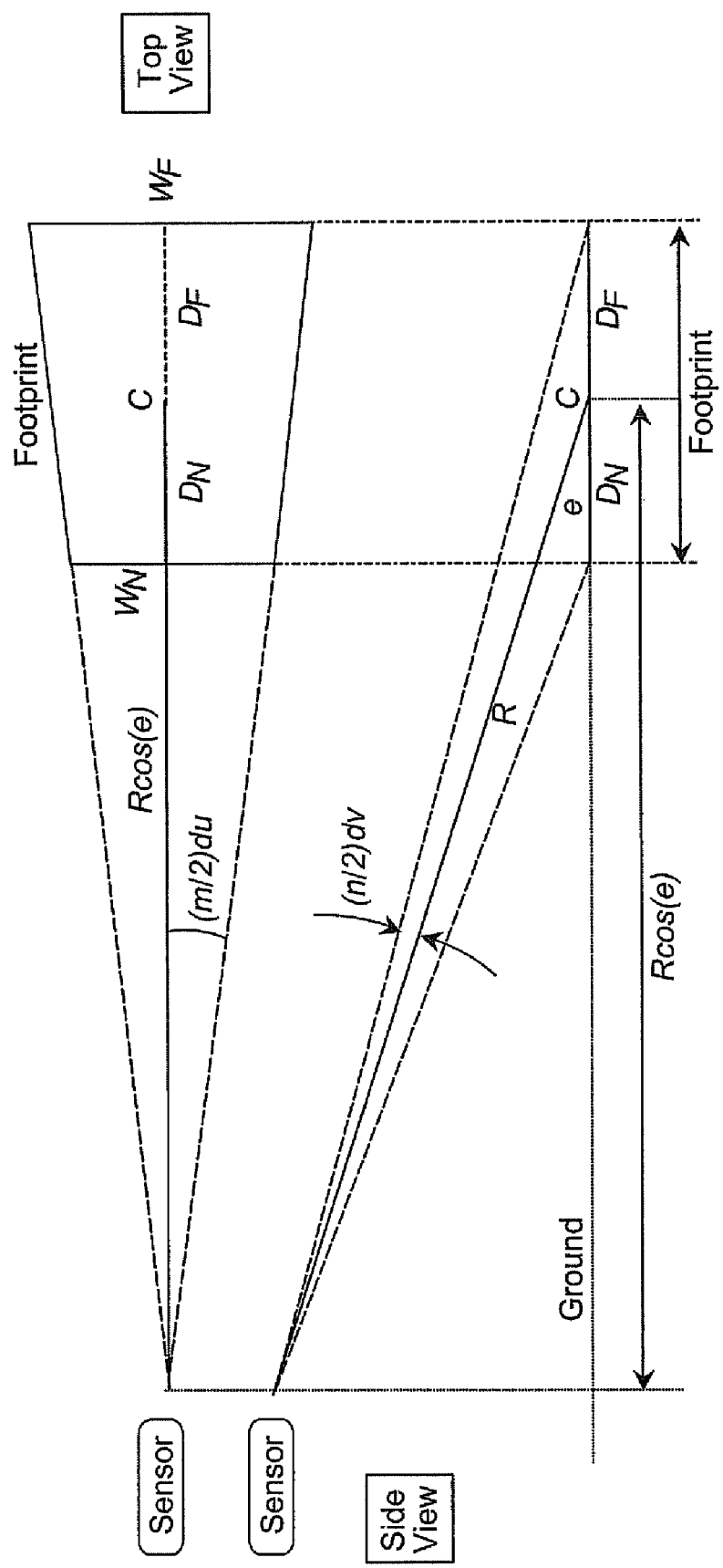
FIG. 2 is a diagram illustrating a sensor footprint derivation.

(2) An analysis 24 is then conducted, using the sensor information 18, sensing parameters 20 and platform parameters 22 to determine what portion of the area covered by a reference image 28 is depicted in the sensor image. Included in this determination are uncertainties in the parameter values used in the determination so that the sensed image will fall within the selected area. This sensed area is called the "sensor footprint," or sometimes the "uncertainty basket". The derivation of the sensor footprint depends on the specific sensor used. As an example, with reference to FIG. 2, the following analysis applies to an image plane array sensor:

Sensor:
m×n pixels
$d_m \times d_n$ radians/pixel ("rad/pix") resolution
e depression angle
a azimuth angle
Footprint:
C center
R range
$D_N, D_F$ downrange near, far
$W_N, W_F$ width near, far
Mathematical Relationships:

$$D_N = R \sin((m/2)d_m)/\sin(e+(m/2)d_m)$$

$$D_F = R \sin((m/2)d_m)/\sin(e-(m/2)d_m)$$

$$W_N = 2 \tan((n/2)d_n)(R \cos(e) - D_N)$$

$$W_F = 2 \tan((n/2)d_n)(R \cos(e) + D_F)$$

Method:
1) Compute $D_N$, $D_F$, $W_N$, $W_F$ from e and R, using sensor parameters n, m and $d_n$, $d_m$, including uncertainties in e and R.
2) Convert $D_N$, $D_F$, $W_N$, $W_F$ into 4 latitude and longitude offsets from C, based on C and azimuth a, assuming sensor roll is zero.
3) Get footprint corners by combining C with 4 offsets, and including uncertainty in C.

Figure 3:
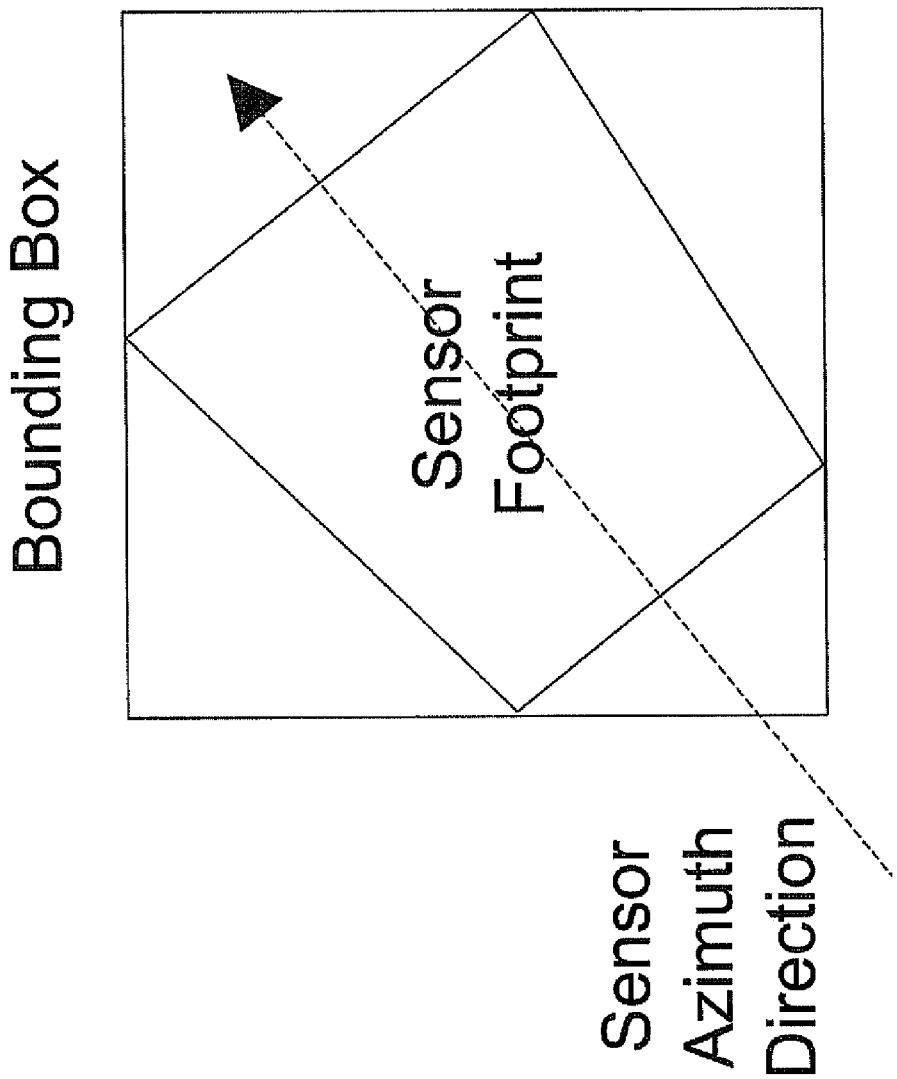
FIG. 3 is a diagram illustrating a bounding box for a sensor footprint.

(3) The sensor footprint is then used to define an area of interest (AOI) 26 of the reference image 28 to be used in the registration process. This restriction is important in order to reduce the image area over which a match must be sought. A minimum bounding rectangle, in reference image coordinates, that covers the sensor footprint is the portion defined as the AOI. This small portion or "chip" 30 of the reference image is extracted for processing. Typically, the sensor footprint comprises a distorted trapezoidal area, and the reference chip is a rectangle that extends to just include the four corners and all the interior of the trapezoid, as shown in FIG. 3.

(4a) If a reference digital elevation model (DEM) 40 is available, a DEM chip 42, similar to the reference chip 30, is extracted from the reference DEM 40. The DEM chip 42 may or may not have the same pixel resolution as the reference chip 30. As part of an orthoimage construction process 44, a reference DEM chip 46 and a reference orthoimage chip 48 may be constructed, the reference DEM chip 46 having resolution and post placement the same as the pixel placement in the reference orthoimage chip 48. Alternatively, an interpolation can be used with the DEM chip 42 each time height values are needed which do not have an exact association with any reference image pixel location. Pixels in a DEM are called "posts" to identify them as height measurements as distinguished from intensity measurements. Coverage by the DEM chip 42 preferably includes the entire AOI covered by the reference chip 30.

(4b) If the reference image 28 consists of a left and right stereo pair, a chip is extracted from each to cover the AOI. The associated stereo model is then exploited to derive a DEM over the AOI. This DEM is accurately associated or aligned with each of the left and right chips, just as a reference DEM is associated or aligned with the reference image 28. Such stereo DEM extraction is performed using standard techniques in any number of commercially available software packages and well documented in the literature. The systems and method described herein utilize such techniques for automatic, unaided stereo extraction.

(4c) Alternatively, a sensor may be used to produce stereo models from time sequential images, which can then be used to produce a DEM. The two sensor images may be obtained by maneuvering the sensor platform so that two different views can be obtained of the scene. Preferably, the views are collected to have relative viewpoints most suited to construction of stereo models, such as having parallel epipolar lines. However, any arbitrary viewpoints can be used, by calibrating the camera model for the sensor images to allow reconstruction of an appropriate stereo model setup. One of many methods to calibrate camera models is the Tsai approach discussed in "A Versatile Camera Calibration Technique For High Accuracy 3D Machine Vision Metrology Using Off-the-shelf TV Cameras and Lenses," by Roger Y. Tsai, in *IEEE Journal of Robotics and Automation*, Volume RA-3, Number 4, August 1987, pages 323-344, which is hereby incorporated by reference. For platforms that are moving directly towards the scene, time sequential images can be used in which one image is a magnification of part of the other image which was acquired at an earlier time. It is necessary to use sufficiently long time intervals between the sensed images in order to ensure sufficient change of viewpoint, such that the changes can be detected and accurately measured. Position changes of ten percent in individual feature locations around the periphery of the second sensor image, from the first to the second image, are generally adequate.

(5a) If the reference chip 30 is not an orthographic image, or is not close to orthographic, so that it exhibits perspective distortion (say more than ten degrees off from a perpendicular view of the scene area so that there is perspective distortion to be seen), it is desirable to remove the perspective distortion by producing the orthographic reference chip 48. This is accomplished using the reference chip 30 together with the reference DEM chip 42, as well as information about the reference image perspective. Such information is normally expressed in the form of mathematical mappings that transform coordinates of the reference scene area (such as geographic coordinates when the scene is of the ground and a height coordinate from the corresponding DEM) into coordinates of the digital or film image. The stereo extraction method of constructing a DEM also yields such information. Construction of the orthographic reference image chip 48 uses standard commercially available techniques. The systems and methods described herein utilize such techniques to automatically produce orthographic images in an unaided fashion.

(5b) If the reference chip 30 is an orthographic image, such that it depicts each pixel as if it had been imaged from directly above, or if it is nearly orthographic such that all parts of the image represent a down-look of at least 80 degrees, further processing of the reference chip is not necessary, and construction of a perspective reference can proceed.

Figure 4:
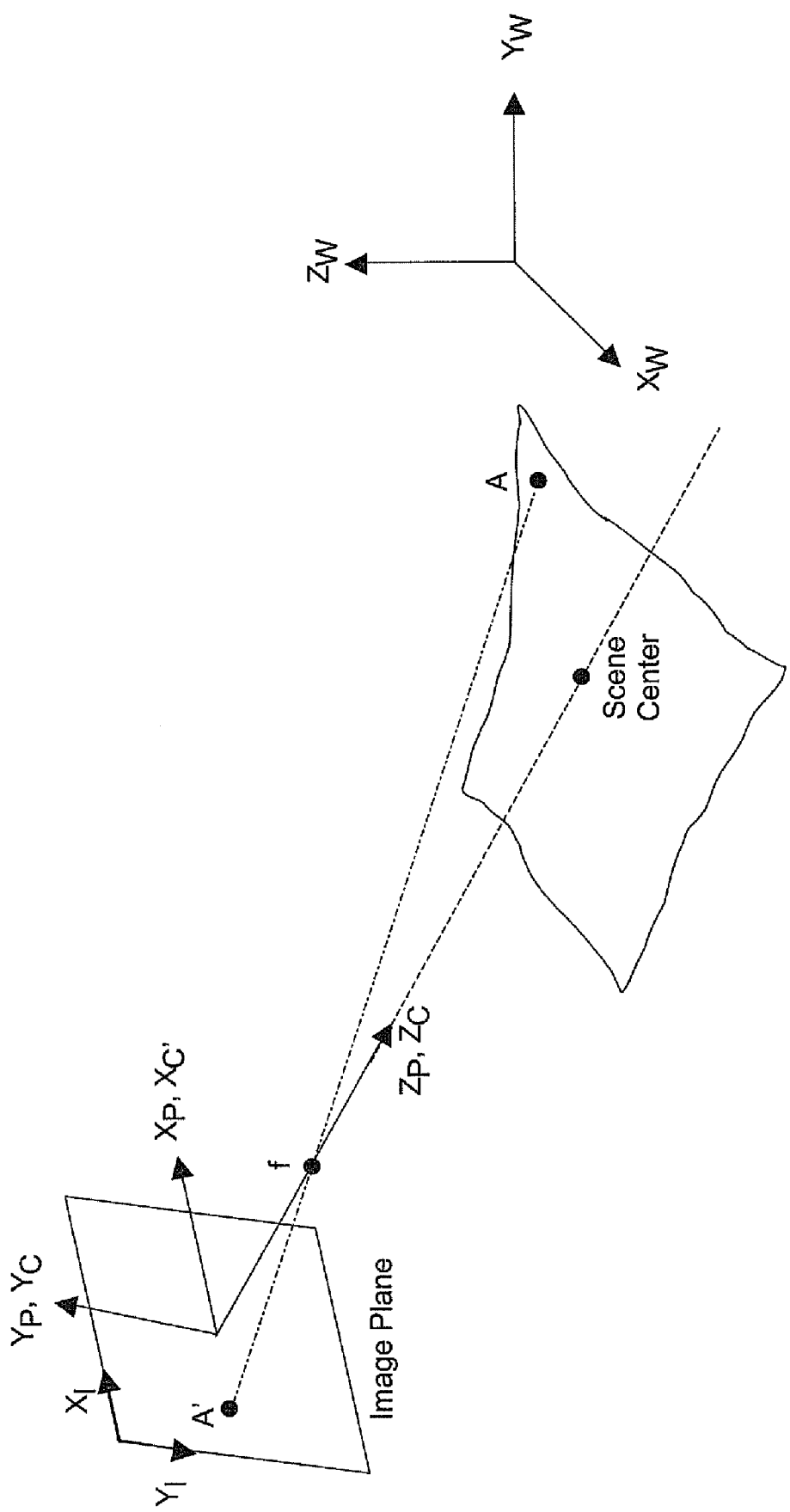
FIG. 4 is a diagram illustration a camera model (pinhole camera) with projection and inverse projection.

(6) Perspective analysis 50 determines the perspective transform parameters 52 and sensor model transform 54 needed to transform 56 the orthographic reference image chip into a synthetic perspective reference image 58 that exhibits the same geometric distortion as the sensor image 12. The analysis also takes into account the various sensor parameters 20, including field of view, resolution, focal length, and distortion function of the lens. In addition, the analysis takes into account parameters of the sensing situation, including location and orientation of the sensor and its line of sight, and the center of the imaged scene. Finally, the analysis takes into account the platform parameters 22 on which the sensing occurred, including the platform's location in space. The platform's velocity and acceleration vectors may also be taken into account. The sensor model 54 can vary in complexity depending on how much or how little distortion the sensor introduces into the image it captures, and how much of this distortion must be matched to provide high quality matches. Good lens-type sensors can be reasonably modeled with a pinhole camera model. With a lower quality lens, various geometric and radiometric distortions may require modeling, such as pincushion or barrel geometric distortion, or vignette intensity shading (image is lighter in the center and darker towards the edges). A synthetic aperture radar sensor may require modeling of slant plane distortion, or that geometric correction be included in the processing done inside the sensor, and not require additional modeling for the image registration process. The complexity of the sensor model may be reduced if the image match function is able to handle certain distortions. For example, if the match process is independent of absolute image intensity values, then radiometric distortions like a vignette pattern will most likely not need modeling. The model of FIG. 4 illustrates a sensor perspective analysis 50 for a pinhole camera model.

Image Plane:
m×n pixel array
$s_m \times s_n$ spacing of pixels
f focal length
Coordinate Frames:
$X_W, Y_W, Z_W$—World coordinate frame, for locations in scene
$X_C, Y_C, Z_C$—Camera coordinate frame
$X_P, Y_P, Z_P$—Projected coordinate frame
$X_I, Y_I$—Image plane coordinate frame, x-cols, y-rows
($Z_I$ not shown, but is retained to perform inverse projection)
Coordinate Transform for Projection and Inverse Projection:
A'=$M_{IP} M_{PC} M_{CW}$ A (projection)
A=$M_{CW}^{-1} M_{PC}^{-1} M_{IP}^{-1}$ A' (inverse projection)
where
A—vector for point A in frame W
A'—vector for image of A in image frame pixel coordinates (only X and Y coordinates used)
and
$M_{IP}$—matrix transform from projected frame into image frame
$M_{PC}$—matrix projection transform from camera frame into projected frame
$M_{CW}$—matrix transform (affine) from world frame into camera frame $$M_{IP} = \begin{bmatrix} m/s_m & 0 & 0 & m/2 \\ 0 & -n/s_n & 0 & n/2 \\ 0 & 0 & 1 & 0 \\ 0 & 0 & 0 & 1 \end{bmatrix}$$

$$M_{PC} = \begin{bmatrix} 1 & 0 & 0 & 0 \\ 0 & 1 & 0 & 0 \\ 0 & 0 & 1 & 0 \\ 0 & 0 & -1/f & 1 \end{bmatrix}$$

$$M_{CW} = \begin{bmatrix} a_x & b_x & c_x & t_x \\ a_y & b_y & c_y & t_y \\ a_z & b_z & c_z & t_z \\ 0 & 0 & 0 & 1 \end{bmatrix}$$

(7) Construction of the perspective reference 58 can be accomplished by any number of different methods. This is a standard process done with most synthetic imaging systems, such as computer games, and numerous techniques are available. The technique used should be quite fast, and specialized methods may be required to achieve adequate speed in generating the perspective reference image. Functions found in many graphics cards for personal computers, particularly those implementing the OpenGL graphics processing standard, allow use of the computer hardware acceleration available on those cards to produce such synthetic perspective images quite rapidly, using the orthographic reference image chip 48 with its associated reference DEM chip 46.

It may be important in forming the perspective reference to preserve the information necessary to compute the inverse perspective. This entails retaining the Z-coordinate, which is produced as each pixel of the perspective reference image is produced, and associating it specifically with the pixel location in the perspective reference image along with the intensity value for that pixel. Normally, only the X and Y coordinate locations computed for the projection (see FIG. 4) are retained and used to identify the location in the projection image at which the pixel value is to be placed. If the Z value is not computed, or not retained, then it is not possible to compute the inverse of the projection in a simple manner, as some means is needed to specify the third variable, that is, the Z component, in the 3-D coordinate transform.

Alternatively, the X and Y coordinates of the pixel in the reference image chip, or in the full reference image, in association with the pixel location in the synthetic reference image to which that reference pixel projects, may be retained. Information is then associated with the synthetic perspective reference to describe how to translate these retained X and Y coordinates back into useful reference image coordinates. Normally, this information is a simple linear transform. As a further alternative, the world coordinates of the scene points; for example, X, Y, Z, or longitude, latitude and height, in association with the pixel locations in the synthetic projected reference image to which those points correspond, may be retained.

(8) Image match 60 is then carried out between the synthetic perspective reference chip 58 and the sensor image 12. Again, there are many techniques that can be used, from a simple normalized image correlation, such as may be performed in the Fourier image transform domain, to a more robust, cross-spectral method like the Boeing General Pattern Match mutual information algorithm described in U.S. Pat. Nos. 5,809,171; 5,890,808; 5,982,930; or 5,982,945, each incorporated herein by reference, to another more robust, cross-spectral method like a mutual information algorithm described in P. Viola and W. Wells, "Alignment By Maximization Of Mutual Information" International Conference on Computer Vision, Boston, Mass., 1995, which is also incorporated herein by reference. According to the system and method of the present disclosure, the only remaining difference between the two images after the processing described above, is a translation offset. This makes the match problem much easier to solve, requiring less computation and yielding a more accurate match result.

(9) A match function 62 is then obtained by using the translation determined by the image match operation 60 to produce an offset location in the perspective reference image 58 for each pixel location in the sensor image 12. Thus, if a pixel is identified in the sensor image 12 as being of interest (for example, as representing an aim point in the scene imaged by the sensor), the match function 62 gives the offset from that pixel location to the pixel location in the perspective reference image 58 that represents that same location in the scene. The association of locations is limited by the match accuracy, which can be predicted by examining the match surface, or by using standard statistical methods with measures collected as part of the image match process 60.

Using the offset pixel location in the perspective reference image (20), and the projection Z value retained and associated with that location, the location of that same point in the scene's world coordinates is readily obtained. The appropriate transform consists of the same sequence of transforms that produces the synthetic projected reference, except each transform is mathematically inverted, and the individual transforms are applied in reverse sequence, yielding the reverse geometrical relationship seen in FIG. 4 and described previously.

Alternatively, the X and Y coordinates from the chip or full reference image may be retained and associated with their corresponding locations in the synthetic perspective reference, in which case the X and Y coordinates are simply taken as the reference image location corresponding to the pixel in the synthetic perspective reference image, and hence to the sensor image pixel that was related by the match offset. As a further alternative, a world coordinate (such as an X, Y, Z, or latitude, longitude, height location), may be retained and associated with the corresponding locations in the synthetic perspective reference, in which case the world coordinate is taken as the desired reference area location. Here the images are registered by referring to common locations in the world coordinate reference system.

Figure 5:
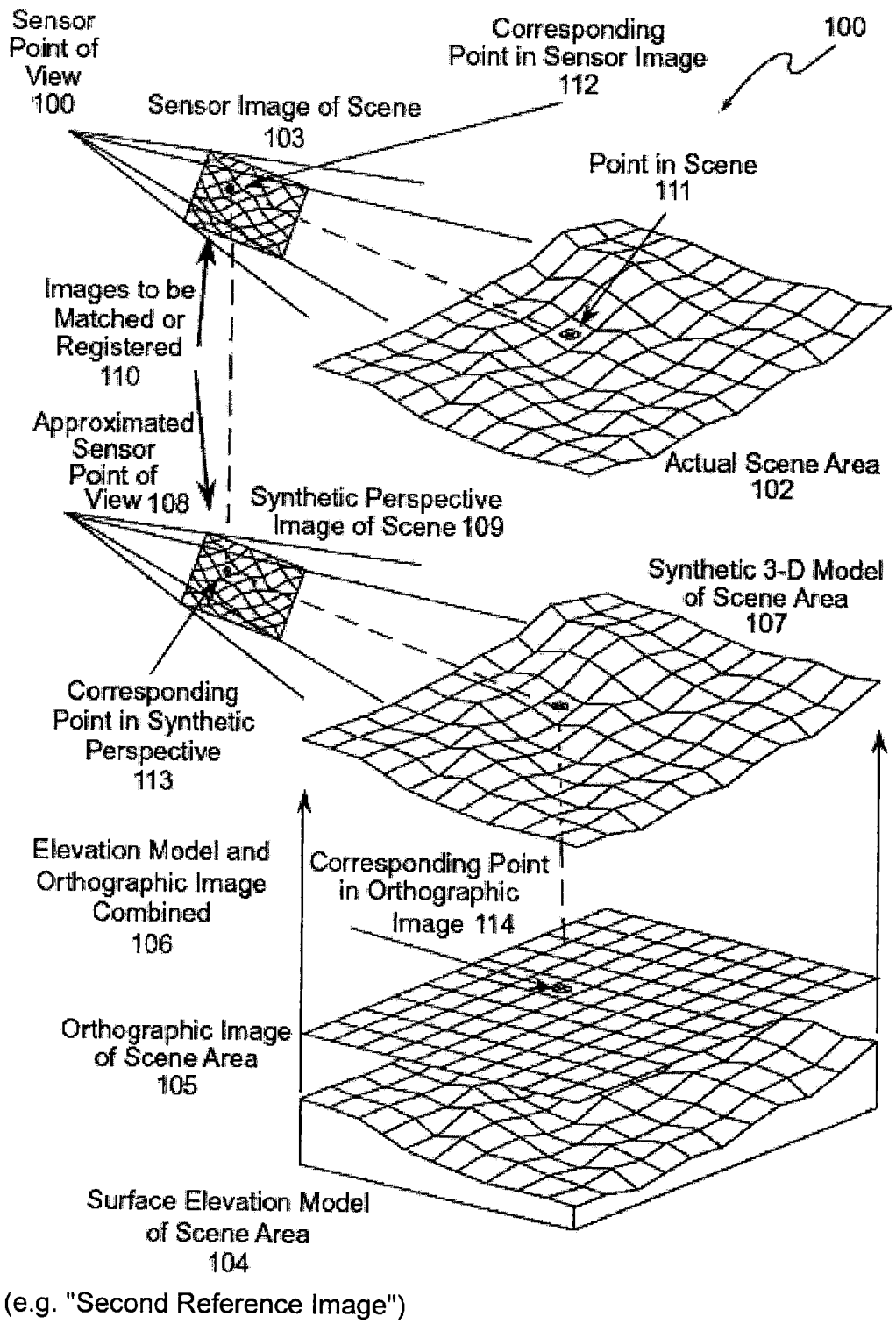
FIG. 5 illustrates an example of an image registration process in accordance with one embodiment of the present disclosure.

FIG. 5 illustrates an example of an image registration process 100 of the present disclosure. An imaging sensor at a particular point of view 101 observes an area 102 of a scene within its field of view, and captures an image 103 portraying some part of that scene. Knowledge of the general location of the scene, and the general location of the sensor, i.e., its point of view, are obtained for use in subsequent processing. Based on the location of this scene, a portion 104 of an elevation model is extracted from a larger database of images which covers the area in which the sensor 101 is expected to capture its image 103. An orthographic image 105 of the scene area covering the extracted portion 104 of the elevation model is also extracted from a larger database of images which covers the area in which the sensor is expected to capture its image 103.

The extracted portion 104 of the elevation model and the extracted portion 105 of the orthographic image are combined (106) into a synthetic 3-D model 107 of the scene area. The synthetic 3-D model comprises an array of pixels corresponding to the orthographic image 105 where each pixel is associated with an elevation from the elevation model 104. If both the orthographic image 105 and the elevation model 104 are at the same spatial resolution so that each pixel and corresponding elevation value or "post" represent the same physical location in the scene 102, the combination comprises placing the pixel and post values together in an array at a location representing the appropriate location in the scene. However, if the orthographic image 105 and the elevation model 104 have different spatial resolutions, it may be desirable to resample the coarser array of data to have the same resolution and correspond to the same scene locations as the finer array of data. Moreover, if the orthographic image 105 and the elevation model 104 have pixels and posts that correspond to different scene locations, such as for example where the scene locations are interlaced, it may be desirable to resample one of the data sets, preferably the elevation model set, so that the pixels and posts of the orthographic image and elevation model correspond to the same scene locations.

The synthetic 3-D model 107 of the scene area is then transformed into a synthetic perspective image 109 of the scene based on knowledge of an approximate sensor point of view 108 according to a sensor perspective model. The sensor perspective model represents an approximation of how the sensor depicts the scene. It may be a standard camera model transform, such as provided by the OpenGL graphics language and implemented in various graphics processors, or it may be a specialized transform that provides faster processing or a specialized sensor model.

An example of a "specialized transform that provides faster processing" is a transform that approximates a full projective transform, but is simplified because the scene area that must be modeled is much smaller than the large, essentially unbounded area to which a standard transform like OpenGL projection must apply. In this situation, it may be possible to apply low order polynomials in a sensor model, because the high order terms in a more complex, higher fidelity model, using higher order polynomials, have small coefficients for the high order terms. With a small sensor image, the small coefficients may be sufficiently small that their contribution to the computation could be ignored. As another example, if the scene is at long range for the sensor, a simpler projection, such as the orthographic projection, may be used.

An example of "specialized sensor model" is use of a pinhole camera model to serve for a lens-type sensor, rather than a more complex model with slightly greater, but unnecessary fidelity. For example, if the sensor lens gives minor pincushion distortion, but the effect is only noticeable around the periphery of the sensor image, a pinhole camera model may be sufficient, particularly if the match portion of the image is restricted to the more central parts of the sensor image.

The sensor image 103 of the scene is registered (110) with the synthetic perspective image 109 of the scene by matching the two images. Thus, there is provided a process to relate any location 111 in the actual scene area 102 to a corresponding location 114 in the orthographic image 105 of the scene area. This is achieved by choosing a point 111 in the actual scene 102, selecting the point 112 in the sensor image 103 of the scene which portrays the point 111, and using the match registration 110 to identify the corresponding point 113 in the synthetic perspective image 109. This corresponding point 113 in turn provides a corresponding point 114 in the orthographic image 105 of the scene area from which the synthetically projected point was produced. These correspondences are indicated by the dashed lines shown in FIG. 5. Direct and rapid inversion of the perspective transform used to generate the synthetic perspective image 109 utilizes the surface elevation model 104 to provide a unique location in the orthographic image 105 for the corresponding point 114. Assuming that the orthographic image 105 of the scene area has precise scene locations associated with each pixel, such as would be the case if the image is geocoded so that each pixel has an associated latitude and longitude, a precise scene location can be associated with all four corresponding points 111-114.

Figure 6:
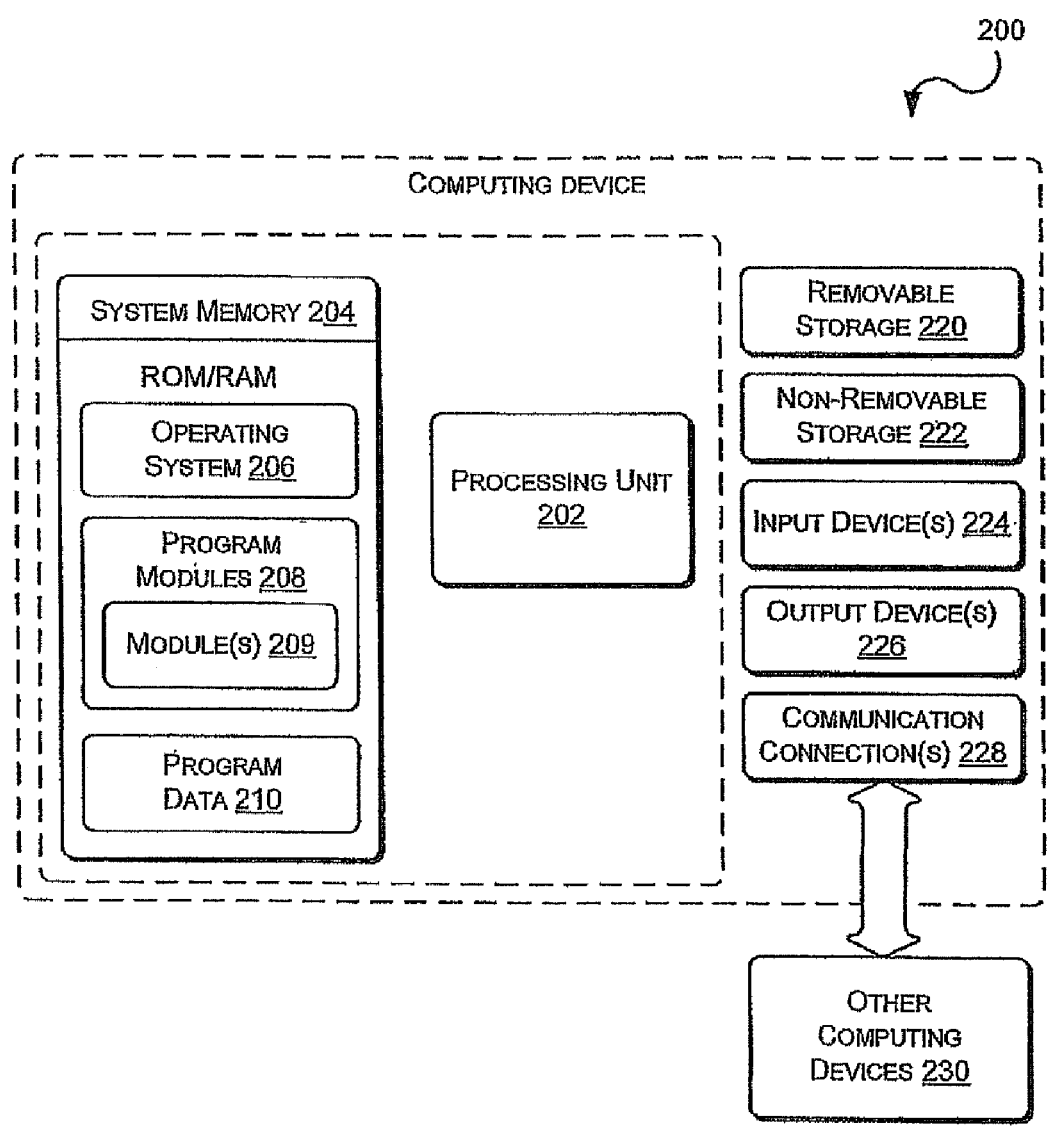
FIG. 6 is a block diagram illustrating functional components in a computing device that may be used to implement the processes and structure described herein.

FIG. 6 is an illustrative computing device that may be used to implement the processes described herein. The illustrated computing device may also be used to implement the other devices illustrated in FIG. 1. In a very basic configuration, the computing device 200 includes at least one processing unit 202 and system memory 204. Depending on the exact configuration and type of computing device 200, the system memory 204 may be volatile (such as RAM), non-volatile (such as ROM and flash memory) or some combination of the two. The system memory 204 typically includes an operating system 206, one or more program modules 208, and may include program data 210.

For the present image processes, the program modules 208 may include the process modules 209 that realize one or more the processes described herein. Other modules described herein may also be part of the program modules 208. As an alternative, process modules 209, as well as the other modules, may be implemented as part of the operating system 206, or it may be installed on the computing device and stored in other memory (e.g., non-removable storage 222) separate from the system memory 204.

The computing device 200 may have additional features or functionality. For example, the computing device 200 may also include additional data storage devices (removable and/or non-removable) such as, for example, magnetic disks, optical disks, or tape. Such additional storage is illustrated in FIG. 6 by removable storage 220 and non-removable storage 222. Computer storage media may include volatile and non-volatile, removable and non-removable media implemented in any method or technology for storage of information, such as computer readable instructions, data structures, program modules, or other data. The system memory 204, removable storage 220 and non-removable storage 222 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media may be part of the device 200. Computing device 200 may also have input device(s) 224 such as keyboard, mouse, pen, voice input device, and touch input devices. Output device(s) 226 such as a display, speakers, and printer, may also be included. These devices are well known in the art and need not be discussed at length.

The computing device 200 may also contain a communication connection 228 that allows the device to communicate with other computing devices 230, such as over a network. Communication connection(s) 228 is one example of communication media. Communication media may typically be embodied by computer readable instructions, data structures, program modules, or other data in a modulated data signal, such as a carrier wave or other transport mechanism, and includes any information delivery media.

Various modules and techniques may be described herein in the general context of computer-executable instructions, such as program modules, executed by one or more computers or other devices. Generally, program modules include routines, programs, objects, components, data structures, and so forth. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 7:
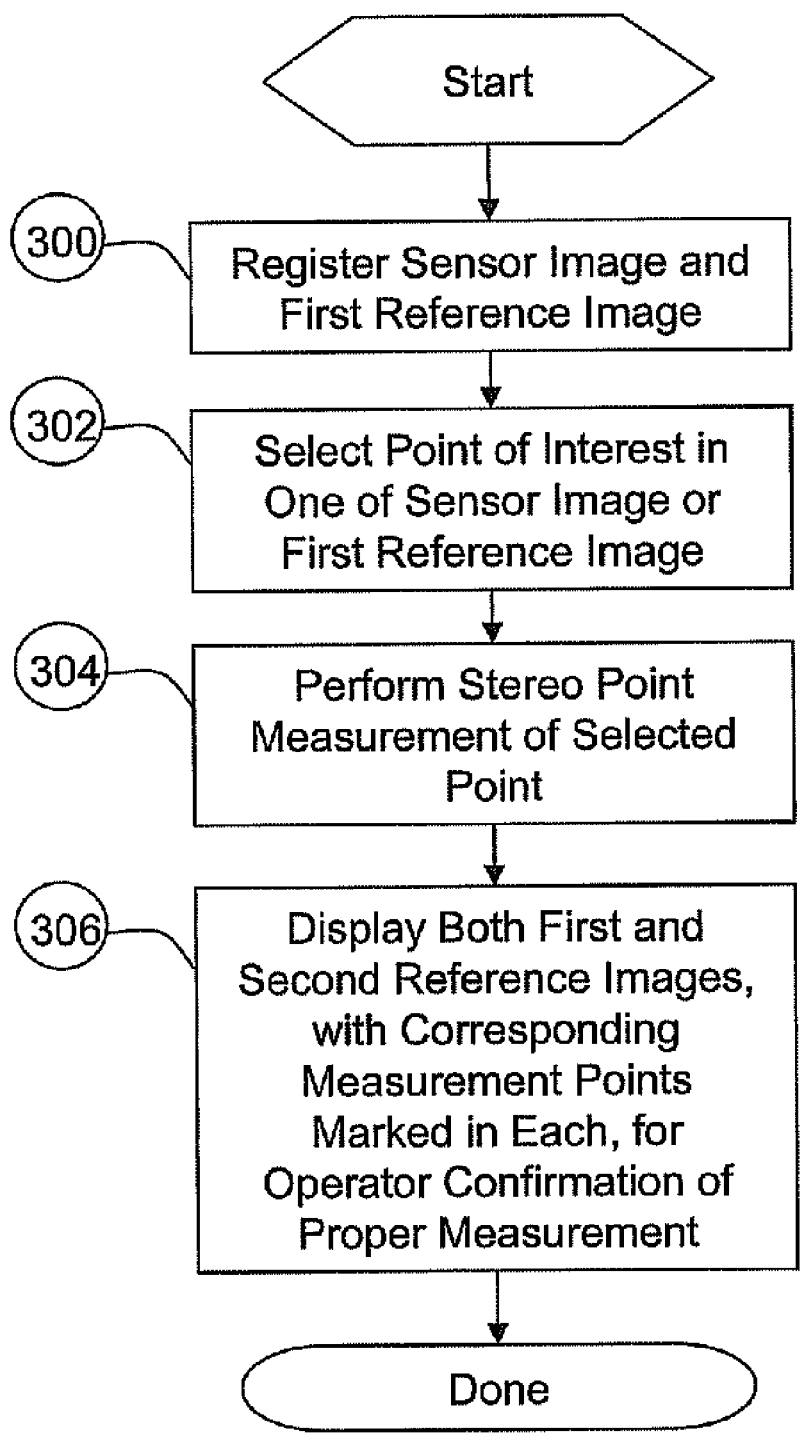
FIG. 7 is a high level flowchart illustrating exemplary operations in accordance with a method of the present disclosure for performing stereo point measurement to obtain a stereo matching point on a second image that corresponds to a selected point on a first image.

Referring now to FIG. 7, an exemplary method for performing stereo measurement of a selected point in an image is set forth. The method automatically performs three dimensional, stereo measurement, with optimum or near optimum accuracy, of a point in one image of a stereo reference image pair. It does this with no operator intervention, but still optionally allows an operator to review the result to ensure validity. In general, the method begins with a single point, a pixel, located in a first image of the stereo pair of reference images. The method obtains an optimum accuracy stereo measurement that includes that specific pixel in the first of the two stereo images, along with a second specific pixel in the second of the two stereo images, the second pixel being the stereo mate of the first pixel. The single point in the first of the reference images is obtained by any method available, but for this example represents the pixel location in the first reference image that was associated with a pixel location in a sensor image under a previously established registration between the sensor image and the first reference image. The pixel location in the sensor image may be obtained in any way, but for this example is selected as a point of interest by an operator. The operator might be a weapons officer in an aircraft selecting an aim point for a target seen in the sensor image, or an operator of a robotic arm selecting a pickup point for an object seen in a sensor image depicting the robot's workspace, or a robotic spacecraft pilot selecting a docking point seen in an image of another spacecraft it was sent to repair.

As depicted in FIG. 7, the process begins with operation 300 in which a sensor image is registered to a first reference image. This may be accomplished as part of the present method, or this operation may be provided as an input item for the present method. In operation 302 a first pixel or point of interest in the sensor image or the first reference image is selected. In operation 304 a stereo point measurement is then conducted, such that the selected point in the first reference image is retained, and the stereo measurement is such that the selected point's stereo matching point in the second reference image is determined. The retention of the first selected point is important to obtaining a highly accurate stereo measurement. The first and second reference images are previously known to be a stereo pair of images, with a suitable parameter model that provides proper information for making stereo measurements of point pairs identified between the two reference images. Finally, operation 306 involves an optional display of the two stereo points, one in the first reference image and the other in the second reference image, so that an observer can view the results and determine the validity and verify the accuracy of the just-performed stereo measurement.

Figure 8A:
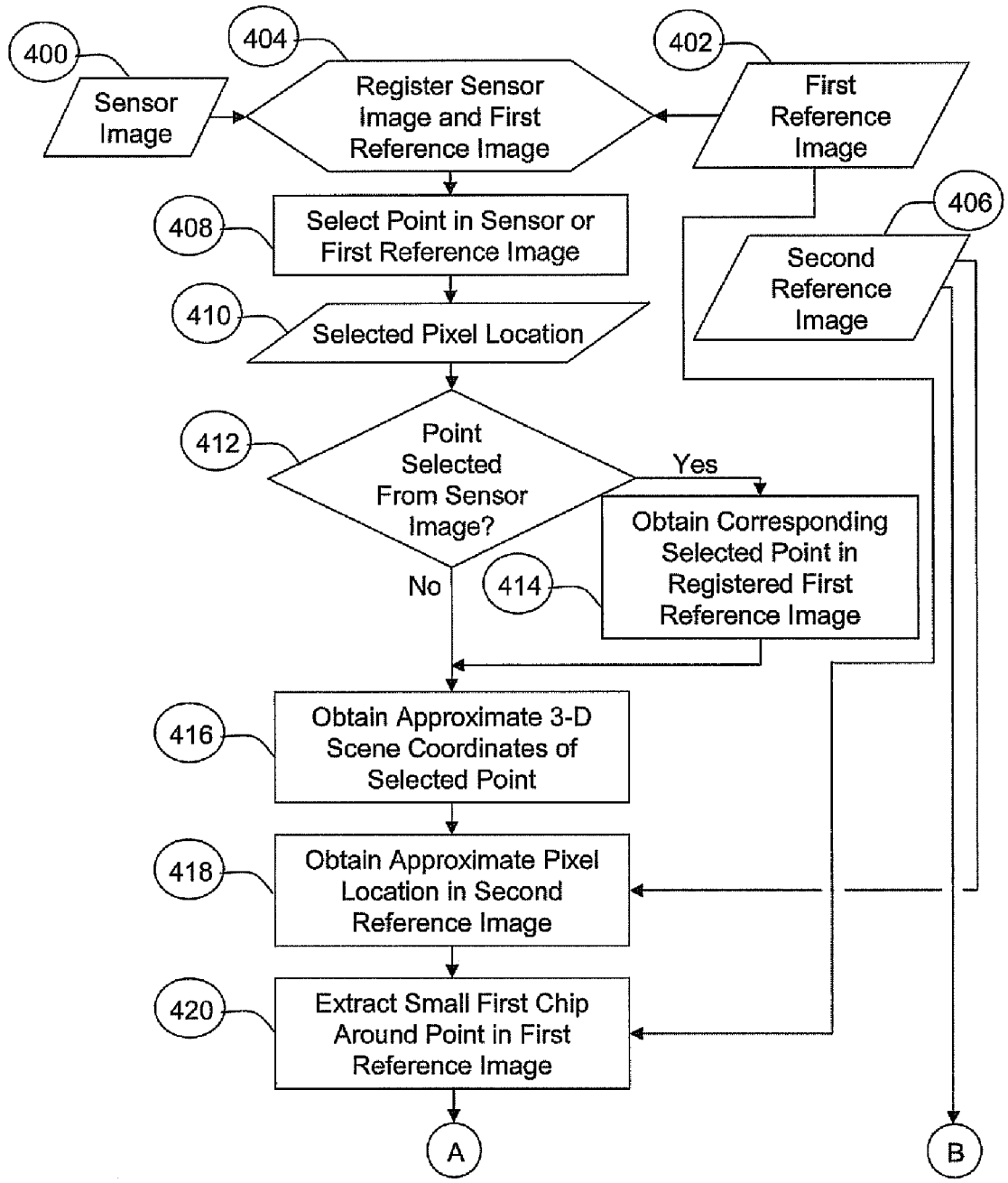
FIGS. 8A and 8B represent a detailed flowchart more fully illustrating the operations of an exemplary method for determining the point in a second reference image that is the stereo matching point of a point selected in a first reference image.
Figure 8B:
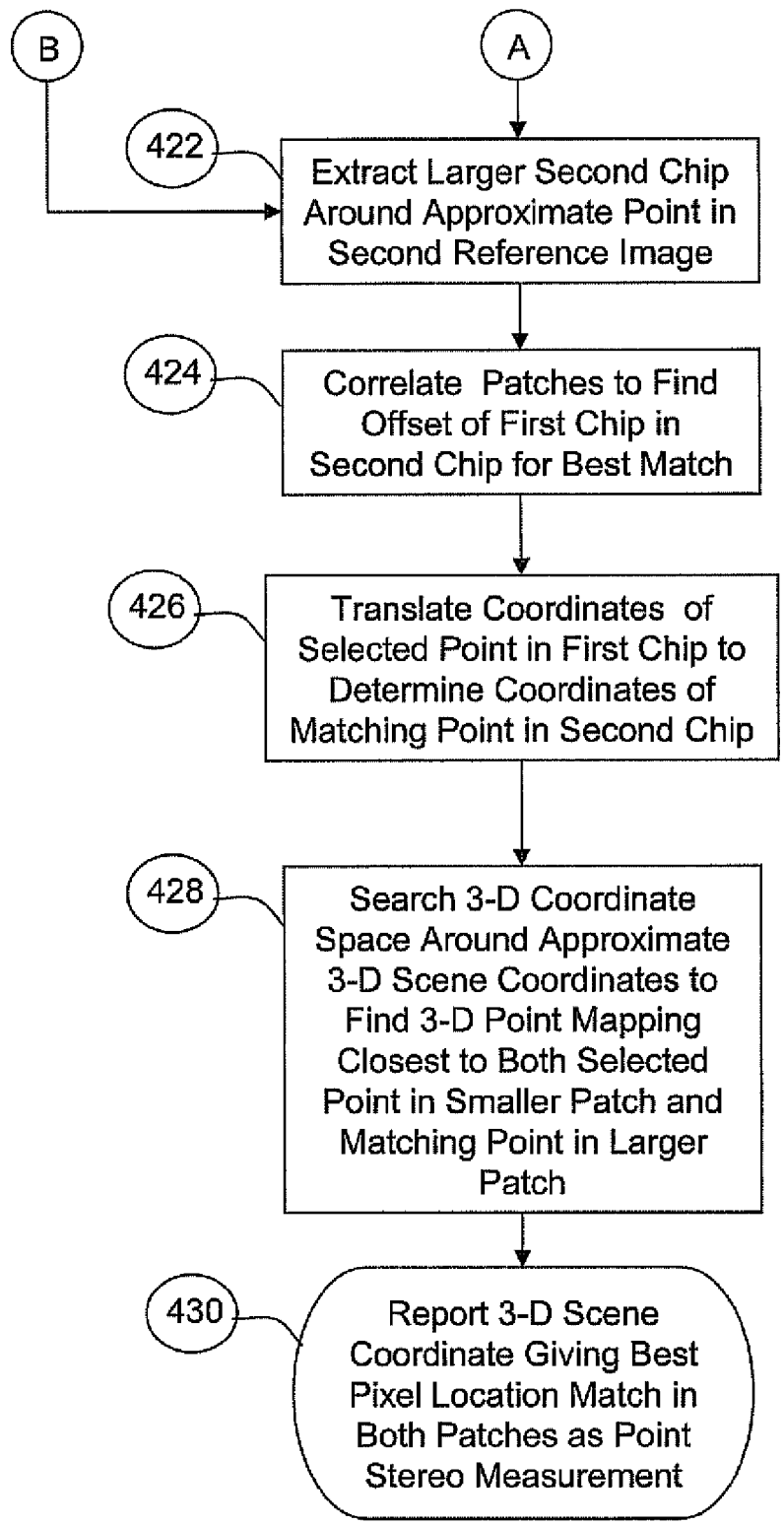

Referring to FIGS. 8A and 8B, a more detailed flowchart is provided setting forth in greater detail a plurality of exemplary operations carried out in performing the method of the present disclosure. At operation 400 a sensor image 11 is obtained. At operation 402 a first reference image is obtained that approximately corresponds to the scene being imaged by the sensor. At operation 404, the sensor image obtained at operation 400 is then registered to the first reference image obtained at operation 402. The first reference image includes an elevation model (not shown) so that three dimensional (i.e., "3-D") coordinates in the scene from the sensor image are accurately associated with each pixel in the first reference image. A second reference image is obtained at operation 406 that is the stereographic "mate" of the first reference image, and the two reference images together have associated parametric data (not shown) that allow highly accurate stereographic measurements to be made from them.

An operator, or an automated system that identifies points of interest, then selects, at operation 408, a point of interest in the sensor image. This point of interest represents a particular pixel location in the sensor image, as indicated at callout 410, and could be selected in either the sensor image or the first reference image (because the two images have been registered). A determination is then made at operation 412 as to whether the selected was selected from the sensor image. It is preferred that the selected point actually be visually distinguishable in the image from which it is selected so that precise selection is possible. If the inquiry at operation 412 is "Yes", then at operation 414, using the predefined registration between the sensor image and the first reference image, a selected pixel location in the sensor image is used to derive a corresponding selected pixel location in the first reference image. From the derived corresponding pixel location in the first reference image, an approximate 3-D scene coordinate for the selected pixel may be obtained, as indicated at operation 416. This is possible due to the accurate association of first reference image pixel locations to 3-D scene coordinates associated with the first reference image.

At operation 418, the approximate 3-D scene coordinate of the selected pixel is then used with the second reference image, and the associated parametric data, to obtain an approximate second selected pixel location in the second reference image. This second selected pixel location in the second reference image corresponds to the selected pixel of the first reference image. Small image chips (i.e., sub-images) are then extracted from the two reference images. At operation 420, a first image chip is extracted from areas around the location of the selected pixel in the first reference image. At operation 422, a second image chip, larger in area than the first image chip and generally centered around the approximate pixel location obtained at operation 418 in the second reference image, is extracted from the second reference image. The first image chip extracted from the first reference image need only be large enough to capture enough feature data from the first reference image to ensure a reliable correlation or match to a portion of the second reference image. The selected point in the first image chip is taken as known, and is not adjusted further.

Figure 8C:
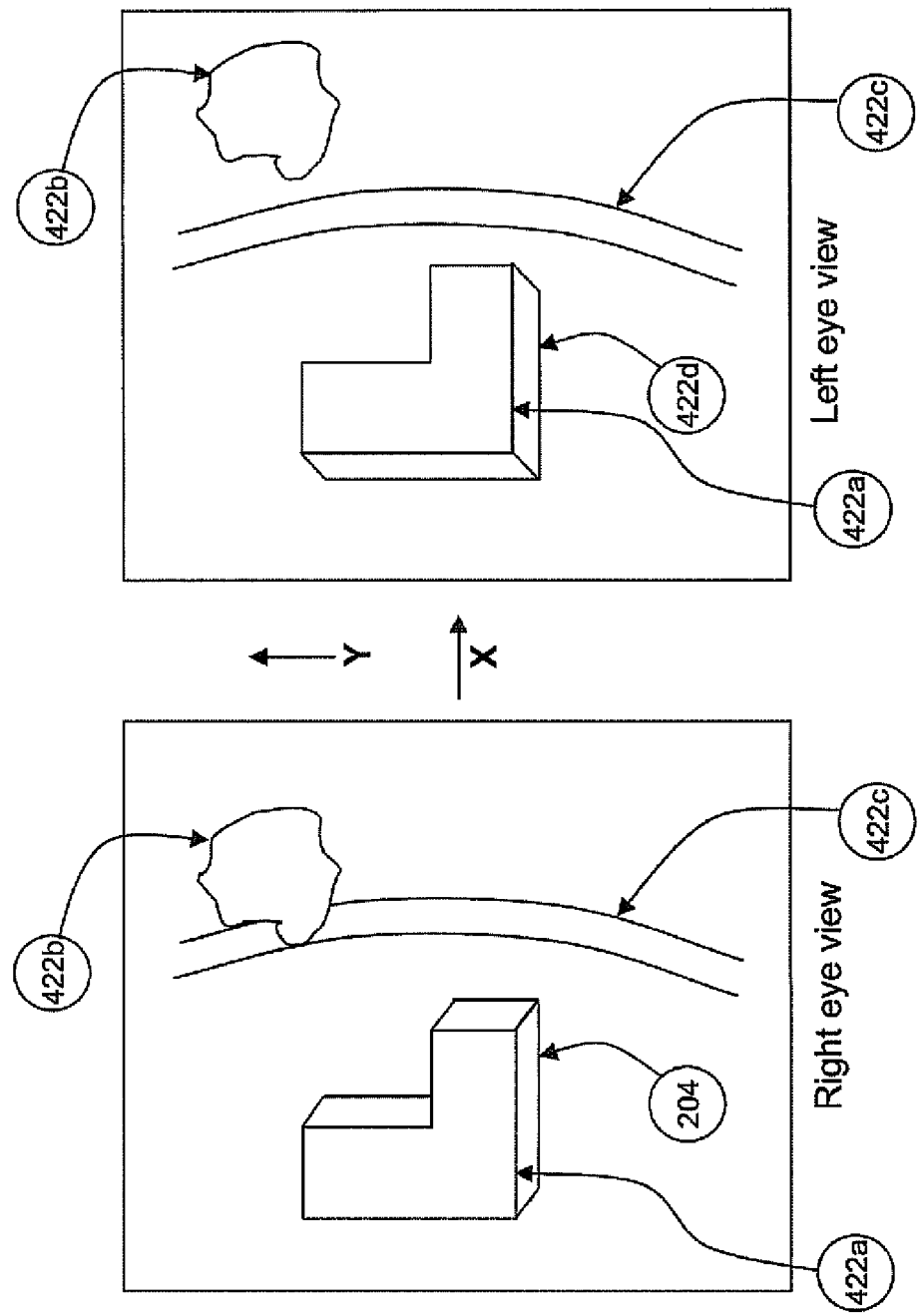
FIG. 8C shows two views ("right eye" and "left eye") of an exemplary scene to illustrate stereoscopic or "X axis" parallax as the left-right or image X axis displacement of elevated features in two simulated overhead images.

Referencing FIG. 8C, for the first image chip, a size of about 15 by 5 pixels may suffice, with 15 pixels in the stereoscopic parallax direction of the first reference image. FIG. 8C illustrates stereoscopic or "X axis" parallax as the left-right or image X axis displacement of elevated features in the two simulated overhead images. The building top 422a and the tree top 422b are elevated features, and are displaced in the images because of their elevated stature compared to the road 422c and the building base 422d. The 5 pixel dimension of the chip allows accommodation for a small amount of "Y axis" parallax (not illustrated), which is unwanted image Y axis displacement of elevated features occasionally found in stereo image pairs. Examining FIG. 8C with crossed-eye viewing can reveal a 3-D perceived appearance of the scene. A larger or smaller size for the first image chip may be used, as long as the feature content of the first image chip is sufficient to allow a reliable stereo match operation between the first and second image chips, with the smaller size being preferred in order to enable a shorter processing time. The second image chip from the second reference image must be somewhat larger, as it must encompass enough area from the second reference image so that uncertainty in the actual match location between the first and second image chips, and an anticipated parallax offset, will still allow determination of the best match point to occur with the smaller first image chip fully positioned over some part of the second image chip. If the stereographic parameters for the stereo reference images are sufficiently accurate, and the elevation changes around the selected point are not abrupt, the second image chip may need only be about twice the size, in the stereo parallax dimension, as the first image chip. This size will have to allow also for scene elevation variation that may induce larger stereographic offsets between the first and second reference images. In some instances a larger second image chip size, perhaps as much as four times larger in the stereo parallax dimension may be needed. Examination of elevation differentials in the immediate neighborhood of the selected point can provide automatic guidance in setting this size, or a larger, fixed size may be used. A small increase of size, perhaps 50%, in the image Y axis dimension perpendicular to the stereoscopic parallax may also be included, to accommodate small parallax offset in that dimension, as may be called out in the specification of the stereo reference image parameters.

Referring further to FIG. 8B, the two reference image chips are then matched, at operation 424, by any suitable image matching process, such as normalized pixel correlation. This matching operation determines an offset of the smaller image chip within the larger image chip, to a position where the match is optimized according to the image matching process being used. For normalized pixel correlation, the maximum positive correlation value would indicate a best match. The match offset so determined, and the offset of the second image chip, as extracted from the second reference image, are then combined at operation 426, to translate the coordinates of the selected pixel in the first reference image, and so to determine coordinates of the matching selected pixel in the second reference image.

The match offset measure will direct where the selected point from the first image chip is aligned with its stereo mate pixel, which may be called the "matched selected pixel" in the second image chip. Since the position of the second image chip within the second reference image is known (because the second image chip was extracted from the second reference image), the offset determined from the match process, combined with the offset of the second image chip extraction, yields a best match location of the selected point of the first reference image, to a matched selected point in the second reference image. The coordinates of the selected point in the first image chip are added to the column and row offset of the first image chip within the second image chip at best match, and this column and row offset is added to the column and row offset of where the second image chip was extracted as a sub-image from the second reference image, to produce the coordinate of the matched selected pixel in the second reference image.

The matched selected pixel will usually not have the same coordinate in the second reference image as the approximate second selected pixel. However, if the pixels are the same, the measurement is complete, and the approximate 3-D scene coordinate of the selected pixel is taken as the best stereo measurement for the selected pixel.

The accuracy of this match is the best that can be obtained from stereographic processing, and the selected and matched selected pixels so selected are thus known in pixel coordinates (i.e., pixel locations) of the two reference images. However, knowing pixel locations of the matching pixels may not directly yield high accuracy scene coordinates. If the stereo reference image parameters allow direct derivation of high accuracy scene coordinates from pixel coordinates, the two pixel locations in the two reference images should derive the same scene coordinates, to within specified accuracy of the stereo reference images. In most instances, however, this is not the case, because a parameter set able to provide such capability, with suitably high accuracy, would involve a collection of data much larger than just the data representing the two images, in order to provide the third dimension information from the two dimensional pixel coordinates. This data would typically involve extremely large amounts of data storage, perhaps more than 16 times that of the reference images, which are themselves often quite large, making the approach unsuited in many practical situations.

For most stereo reference images, the parameters used to represent the reference images represent computational models of a sensor and a sensor point of view, as this is a substantially simpler and smaller collection of data than that needed to model the image to scene relationship directly. A stereo reference image pair using this common approach may be called a model-based stereo reference. The model is defined so that each given coordinate in the scene is associated with an individual pixel in each of the two reference images. The accuracy of the stereo reference is the accuracy with which the pixels so associated by the model with a given point coordinate in the scene, represent depictions in the two images of the exact same point in the scene, and with that point in the scene having the given scene coordinate. In another view, the accuracy is the size of the three dimensional volume in scene coordinates, all of whose point coordinates map to both of the pixels in the two reference images. This modeling method is used, for example, for DPPDB stereo reference images.

Under the model-based stereo reference method, an entire volume of 3-D coordinates is provided. The volume of 3-D coordinates can all be processed using the parameters of the two stereo reference images to produce the pixel coordinates of the selected point in the first reference image. However, only a small, "first" sub-volume of the 3-D coordinates will also process to produce pixel coordinates of the matched selected point in the second reference image. Similarly, there is an entire volume of 3-D coordinates, all of which will process in the same way to produce the matched selected point location in the second reference image, but only a small, "second" sub-volume of which can also process to produce the selected point location in the first reference image. It is a three dimensional location common to both these small first and second sub-volumes, which represents a point in the volumetric intersection of the two larger volumes, which is sought as the best scene coordinate measurement in the second reference image for the selected pixel associated with the first reference image.

To obtain high accuracy scene coordinates for the selected point, a number of techniques exist, and may be seen in existing art. One technique is with SOFTPLOTTER® digital map production software owned by The Boeing Company, and originally developed by Autometric, Inc., now a wholly owned subsidiary of The Boeing Company. Another application for obtaining the stereo matching scene coordinates for the selected point is RAINSTORM® targeting software available from Northrop Grumman. One alternative method will be described here, with an overview for a second alternative method, to present novel approaches suited to more limited processors and processing environments that may be found in embedded systems such as those in fighter aircraft or remote robot control systems.

A direct method for obtaining the scene coordinates is to examine a volume of 3-D scene coordinates surrounding the approximate three dimensional scene location initially obtained for the selected point, as indicated at operation 428. This volume of data is examined to find the 3-D scene coordinates that map closest to both the selected point in the first image chip and the stereo matching point in the second, larger image chip. At operation 430, the 3-D scene coordinates giving the best pixel location match to the selected point, in both of the image chips, is determined to be the scene coordinate of the stereo measurement for the selected point.

Figure 9A:
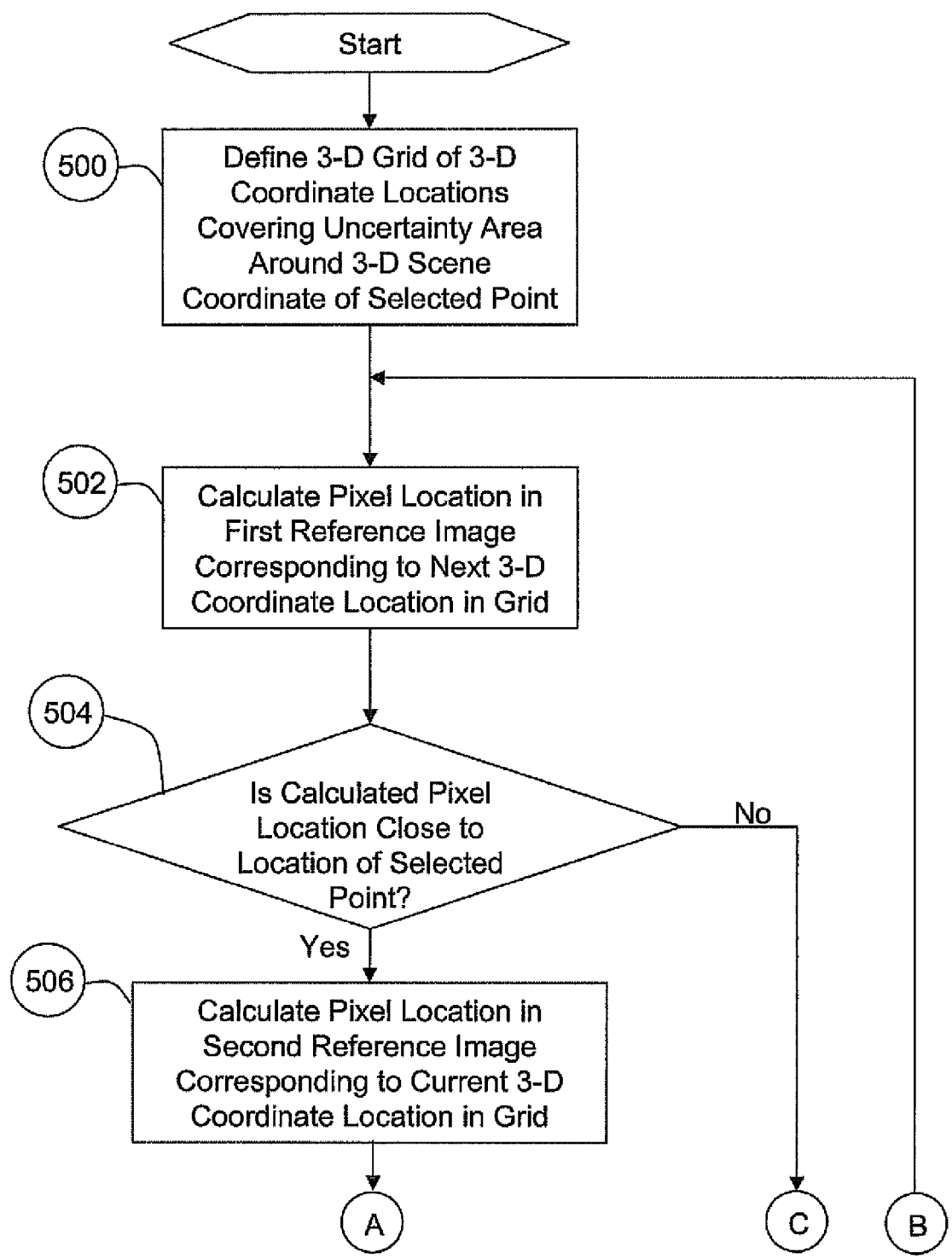
FIGS. 9A and 9B represent a flowchart of an exemplary method for using a three dimensional grid and the stereo matching points obtained in FIGS. 8A and 8B, to determine the three dimensional coordinate of a derived point that is an optimum match for the location of the stereo matching point in the second reference image.
Figure 9B:
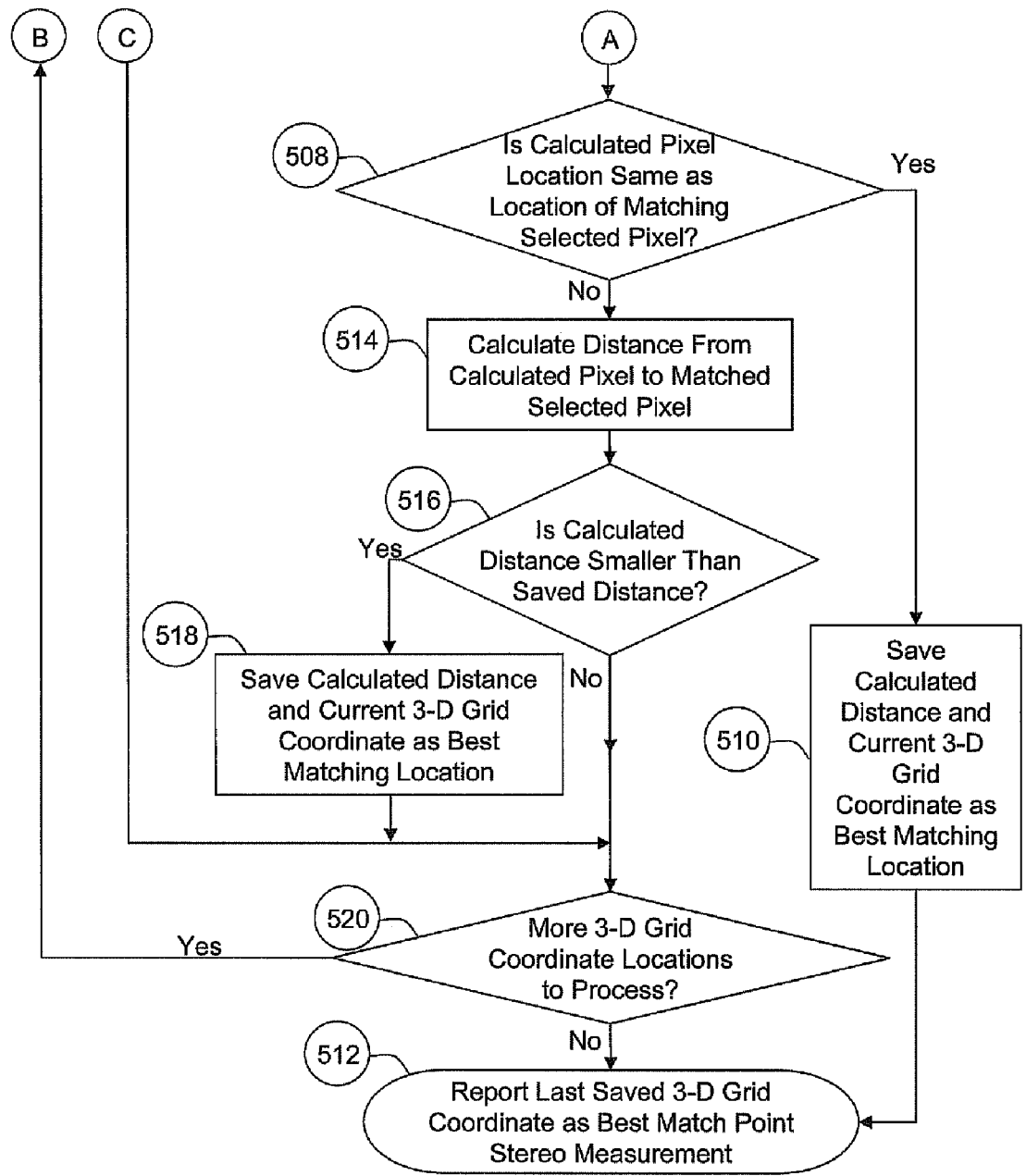

Referring to FIGS. 9A and 9B, a more detailed description of the sub-operations performed for determining the optimum pixel location match in operations 428 and 430 will be provided. At operation 500, a three dimensional rectangular volume is defined around the initial scene location, to extend approximately equally on both sides of the initial scene location in each of the three dimensions (i.e. X, Y and Z directions). The size of this volume is determined using the accuracy specification for the reference image and elevation model for single image measurements, according to the desired probability of finding the location that best represents the true location, using known statistical methods. Within this rectangular volume, a grid of 3-D point locations is defined. The grid of 3-D point locations has spacings in the three dimensions equal to the accuracies needed in the three dimensions for the measurement. The spacings may be different in the three dimensions, and should be no greater than the accuracies specified for stereographic measurements using the reference images, or else extra calculations may be performed without any corresponding accuracy improvement beyond the specification. The grid should also be defined so that one grid point, perhaps the center point, has the exact 3-D coordinates determined for the selected point in the first reference image. This 3-D coordinate point will typically not be the best measurement that will eventually be determined, but will serve as a starting point and guide for constructing the three dimensional rectangular search volume.

Each 3-D point in the grid is then processed, at operation 502, using the parametric data of the stereo reference images, to produce a derived pixel location in each of the two reference images. A determination is made at operation 504 to determine which grid points process to derive a calculated location that is within a predetermined distance to the pixel representing the selected point. Any grid points that do not process to derive the selected pixel location in the first reference image are discarded as not producing a proper stereo match point. Note that it is known that at least one of the grid points will process to derive the location of the pixel that corresponds to the selected point.

At operation 508, a determination is made for the second reference image if the calculated pixel location obtained from operation 506 matches the location of the stereo mate pixel. If the answer to this inquiry is "Yes", then the current, calculated 3-D grid coordinate is saved as the best matching location for the stereo mate pixel, as indicated at operation 510, and reported as the best match point stereo measurement at operation 512.

If the inquiry at operation 508 produces a "No" answer, then the distance in the second reference image from the pixel location so derived (at operation 506) for the second reference image, to the matched selected point location (i.e., the stereo mate pixel) in the second reference image, is obtained at operation 514. For measuring the distance, a standard Euclidean distance measure may be used, with the distance converted to a common unit, such as meters. At operation 516, a determination is made if the calculated distance is smaller than a predetermined, saved distance. If so, the present calculated distance and current 3-D grid coordinate is saved as the best matching coordinate location in the three dimensional grid, as indicated at operation 518. The 3-D coordinate of the three dimensional grid location which produces the minimum of all the distances so obtained, will be the best 3-D stereo coordinate measurement for the selected point.

At operation 516, if the inquiry produced a "No" answer, then a determination is made if there are more 3-D grid locations available to process, as indicated at operation 520. If the answer is "Yes", then at least operations 502 and 504 are repeated for another 3-D grid point. If the answer at operation 520 is "No", then the last saved 3-D grid coordinate is reported as the best match point stereo measurement at operation 512.

An alternative method of search through the three dimensional grid space could be used. This would employ iterative examination of the partial derivatives of the parametric equations used to calculate pixel locations in the two reference images from 3-D grid coordinates. The search may proceed in steps along individual coordinate axes, with the axis selected at each step according to which partial derivative showed the largest change of pixel location towards the selected or matched selected point location, and the minimum step away from the other selected point location, if both were not towards the desired location. Alternatively, the steps could be on multiples of the three axes, in a direction of greatest reduction in difference between the selected and matched selected point locations. Such a guided search through the grid could yield a substantial improvement (i.e., reduction) in processing time, however, the grid search volume will seldom be so large that it necessitates such a guided search.

Once the automatic stereo measurement has been made, it may be desirable to optionally submit the results to an observer or operator, so the observer can review the stereo match results. This is readily accomplished by placing portions of the first and second reference images on a display screen simultaneously, with a visible mark like a cross-hair on each, depicting the location of the point in each image corresponding to the 3-D scene coordinate established by the stereo measurement. It should be noted that the pixel location so obtained for the first reference image should be that of the selected pixel. For the second reference image, the observer should note if the cross-hair location agrees with the cross-hair location in the first reference image, in the operator's judgment. Any system or method to compare the images may be used. For example a flicker display could be used that alternately and repeatedly displays the two images on a single display screen. The images may be positioned on the screen so that the cross-hair location in each image is portrayed at the same location on the screen for both reference images. Of course, viewing the two reference images on a stereo display would be a very attractive means for validation, but would not be practical, or necessary, in many situations. This is because the optional visual review/confirmation step by the operator requires far less attention and skill than is needed to produce stereo measurements.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for performing three dimensional, stereo measurement, the system comprising:
   a sensor for obtaining a sensor image of a scene;
   a database for providing first and second reference images of the scene that are a stereo pair of images;
   at least one processing system responsive to an output of the sensor and in communication with the database, and operable to:
   register the sensor image with the first reference image;
   select a point of interest from the sensor image;
   derive a point of interest in the first reference image from the selected point of interest in the sensor image and obtain a registration between the sensor image and the first reference image;
   perform a stereo point measurement of the selected point of interest in the first reference image to determine a point in the second reference image that represents a stereo mate of the selected point of interest in the first reference image; and
   further analyze the selected point of interest and the point in the second reference image to select an adjacent three dimensional scene coordinate which more accurately corresponds with the selected point of interest in the sensor image;
   wherein said adjacent three dimensional stereo measurement of the selected point of interest in the sensor image is in the three dimensional scene coordinate.

2. The system of claim 1, further comprising:
   a display for displaying both of said first and second reference images with said points marked on each of said reference images to enable an individual to visually confirm an accuracy of said stereo point measurement operation.

3. The system of claim 1, wherein:
   the first and second reference images are each comprised of a plurality of pixels; and
   wherein the selected point of interest in the first reference image is defined by a first pixel, and the point in the second reference image comprises a second pixel that is the stereo mate in the second reference image of the first pixel.

4. The system of claim 3, wherein:
   the selected point of interest in the first reference image is used by the processing system to obtain coordinate data that corresponds to the pixel of the selected point of interest in the first reference image; and
   the point in the second reference image is used by the at least one processing system to obtain coordinate data therefor.

5. The system of claim 3, wherein the at least one processing system is configured to perform a stereo point measurement.

6. The system of claim 5, wherein the stereo point measurement is accomplished by:
   obtaining a first sub-image of the first reference image in an area circumscribing the selected point of interest in the first reference image;
   obtaining a second sub-image of the second reference image in an area circumscribing the point in the second reference image, and where the second sub-image is larger than the first sub-image;

overlaying at least a portion of the first sub-image over the second sub-image;

matching the two sub-images to determine a first offset of the first sub-image within the second image, and a second offset of the second sub-image relative to the second reference image;

using the first and second offsets to translate coordinates of the first pixel to stereo matching coordinates of the second pixel, and wherein the stereo matching coordinates of the second pixel represent a specific point on the second reference image that corresponds to a location of the first pixel on the first reference image.

7. The system of claim 6, wherein the at least one processing system is configured to obtain the stereo matching coordinates of the second pixel by:

determining column and row offset values that represent the first offset of the first sub-image within the second sub-image;

determining column and row offset values that represent the second offset of the second sub-image relative to the second reference image;

adding column and row coordinates of the first pixel in the first sub-image to the column and row offset values of the first sub-image offset to produce a modified first sub-image offset having associated column and row offset values; and adding the modified first sub-image column and row offset values to the column and row offset values of the second sub-image, to produce coordinates of the second pixel.

8. The system of claim 3, wherein the at least one processing system is configured to:

define a three dimensional grid of points with the three dimensional measurement of the selected point of interest at a volumetric center of the three dimensional grid of points;

process each one of said three dimensional grid of points using parametric data for said first and second reference images to identify a subset of the grid points that process to derive a location of the first pixel within the first reference image;

use the subset of said grid points to derive a location of a corresponding, stereo matching pixel in the second reference image;

determine a distance between the derived location of said corresponding, stereo matching pixel and the second pixel, within the second reference image; and repeat the processing of each one of the three dimensional grid of points and using the subset of the grid points to derive a location of a specific three dimensional grid point that, when processed using the parametric data, yields a location for a specific matching pixel that has a minimum distance from the second pixel, and denoting a three dimensional grid point of the specific matching pixel as an optimum three dimensional stereo coordinate location for the selected point of interest in the sensor image.

9. The system of claim 1, wherein:

the first reference image comprises a plurality of pixels;

the second reference image comprises a plurality of pixels;

the first reference image is provided with a corresponding elevation model; and three dimensional scene coordinates are associated with each said pixel in the first reference image.

10. A system for performing three dimensional, stereo measurement, the system comprising:

a sensor for obtaining a sensor image of a scene;

a database for providing first and second reference images of the scene that are a stereo pair of images;

at least one processing system responsive to an output of the sensor and in communication with the database, and operable to:

register the sensor image with the first reference image;

select a point of interest in the sensor image;

derive a point of interest in the first reference image from the selected point of interest in the sensor image and a registration between the sensor image and the first reference image;

perform a stereo point measurement from the selected point of interest in the first reference image to determine a point in the second reference image that represents a stereo mate of the selected point of interest in the first reference image;

using the stereo point measurement to select a three dimensional scene coordinate which more accurately corresponds with the selected point of interest in the sensor image; and a display for displaying both of said first and second reference images with said points displayed on each of said reference images to enable an individual to visually confirm an accuracy of said stereo point measurement operation.

11. The system of claim 10, wherein:

the first and second reference images are each comprised of a plurality of pixels; and wherein the selected point of interest in the first reference image is defined by a first pixel, and the point in the second reference image comprises a second pixel that is the stereo mate in the second reference image of the first pixel.

12. The system of claim 11, wherein:

the selected point of interest of the first reference image is used by the at least one processing system to obtain coordinate data that corresponds to a pixel of the selected point of interest in the first reference image; and the point in the second reference image is used by the at least one processing system to obtain coordinate data therefor.

13. The system of claim 10, wherein the at least one processing system is configured to perform a stereo point measurement by:

obtaining a first sub-image of the first reference image in an area circumscribing the selected point of interest in the first reference image;

obtaining a second sub-image of the second reference image in an area circumscribing the point in the second reference image, and where the second sub-image is larger than the first sub-image;

overlaying at least a portion of the first sub-image over the second sub-image;

analyzing the two sub-images to determine a first offset of the first sub-image within the second image, and a second offset of the second sub-image relative to the second reference image;

using the first and second offsets to translate coordinates of the first pixel to stereo matching coordinates of the second pixel, and wherein the stereo matching coordinates of the second pixel represent a specific point on the second reference image that corresponds to a location of the first pixel on the first reference image.

14. The system of claim 13, wherein the at least one processing system is configured to obtain the stereo matching coordinates of the second pixel by:

determining column and row offset values that represent the first offset of the first sub-image within the second sub-image;

determining column and row offset values that represent the second offset of the second sub-image relative to the second reference image;

adding column and row coordinates of the first pixel in the first sub-image to the column and row offset values of the first sub-image offset to produce a modified first sub-image offset having associated column and row offset values; and adding the modified first sub-image column and row offset values to the column and row offset values of the second sub-image, to produce the coordinates of the second pixel.

15. The system of claim 11, wherein the at least one processing system is configured to:

define a three dimensional grid of points with the three dimensional measurement of the selected point of interest at a volumetric center of the three dimensional grid of points;

process each one of said three dimensional grid of points using parametric data for said first and second reference images to identify a subset of the three dimensional grid of points that process to derive the location of the first pixel within the first reference image;

use the subset of said three dimensional grid of points to derive a location of a corresponding, stereo matching pixel in the second reference image;

determine a distance between the derived location of said corresponding, stereo matching pixel and the second pixel, within the second reference image; and repeat the processing of each one of the three dimensional grid of points and using the subset of the grid points to derive a location of a corresponding, stereo matching pair, to determine a specific three dimensional grid point that, when processed using the parametric data, yields a location for a specific matching pixel that has a minimum distance from the second pixel, and denoting a three dimensional grid point of the specific matching pixel as an optimum three dimensional stereo coordinate location for the selected point of interest in the sensor image.

16. The system of claim 10, wherein:

the first reference image comprises a plurality of pixels;

the second reference image comprises a plurality of pixels;

the first reference image is provided with a corresponding elevation model; and coordinates are associated with each said pixel in the first reference image.

17. A system for performing three dimensional, stereo measurement, the system comprising:

a sensor for obtaining a sensor image of a scene;

a database for providing first and second reference images of the scene that are a stereo pair of images, the first and second reference images each being comprised of a plurality of pixels, and the first reference image further being provided with a corresponding elevation model, and wherein coordinates are associated with each said pixel in the first reference image;

at least one processing system responsive to an output of the sensor and in communication with the database, and operable to:

register the sensor image with the first reference image;

select a point of interest from the sensor image;

derive a point of interest in the first reference image from a selected point of interest in the sensor image and a registration between the sensor image and the first reference image, wherein the selected point of interest in the first reference image is defined by a first pixel;

perform a stereo point measurement from the selected point of interest in the first reference image to determine a point in the second reference image that defines a pixel that represents a stereo mate of the selected point of interest in the first reference image;

using the stereo point measurement to select a three dimensional scene coordinate which more accurately corresponds with the selected point of interest in the sensor image; and a display for displaying both of said first and second reference images with said points displayed on each of said reference images to enable an individual to visually confirm an accuracy of said stereo point measurement.

18. The system of claim 17, wherein:

the selected point of interest of the first reference image is used by the at least one processing system to obtain coordinate data that corresponds to the pixel of the selected point of interest in the first reference image; and the point in the second reference image is used by the at least one processing system to obtain coordinate data therefor.

19. The system of claim 18, wherein the at least one processing system is configured to perform a stereo point measurement, and wherein the stereo point measurement is accomplished by:

obtaining a first sub-image of the first reference image in an area circumscribing the selected point of interest in the first reference image;

obtaining a second sub-image of the second reference image in an area circumscribing the point in the second reference image, and where the second sub-image is larger than the first sub-image;

overlaying at least a portion of the first sub-image over the second sub-image;

analyzing the two sub-images to determine a first offset of the first sub-image within the second image, and a second offset of the second sub-image relative to the second reference image;

using the first and second offsets to translate coordinates of the first pixel to stereo matching coordinates of the second pixel, and wherein the stereo matching coordinates of the second pixel represent a specific point on the second reference image that corresponds to the location of the first pixel on the first reference image.

20. The system of claim 19, wherein the at least one processing system is configured to obtain the stereo matching coordinates of the second pixel by:

determining column and row offset values that represent the first offset of the first sub-image within the second sub-image;

determining column and row offset values that represent the second offset of the second sub-image relative to the second reference image;

adding column and row coordinates of the first pixel in the first sub-image to the column and row offset values of the first sub-image offset to produce a modified first sub-image offset having associated column and row offset values; and adding the modified first sub-image column and row offset values to the column and row offset values of the second sub-image, to produce coordinates of the second pixel.

* * * * *